United States Patent
Blanco et al.

(10) Patent No.: US 9,922,561 B2
(45) Date of Patent: *Mar. 20, 2018

(54) INTELLIGENT PARKING SYSTEM

(71) Applicant: MYPARK, CORP, Miami, FL (US)

(72) Inventors: Ricardo Blanco, Guaynabo, PR (US);
Luis Mayendia, Miami, FL (US);
Azam Malik, Coral Gables, FL (US)

(73) Assignee: MyPark, Corp., Miami, FL (US)

( * ) Notice: Subject to any disclaimer, the term of this patent is extended or adjusted under 35 U.S.C. 154(b) by 264 days.

This patent is subject to a terminal disclaimer.

(21) Appl. No.: 14/626,919

(22) Filed: Feb. 19, 2015

(65) Prior Publication Data
US 2015/0237167 A1 Aug. 20, 2015

Related U.S. Application Data

(60) Provisional application No. 61/942,344, filed on Feb. 20, 2014.

(51) Int. Cl.
*G08G 1/14* (2006.01)
*G06F 17/30* (2006.01)
*H04L 29/08* (2006.01)
*G07C 9/00* (2006.01)

(52) U.S. Cl.
CPC ....... *G08G 1/149* (2013.01); *G06F 17/30979* (2013.01); *G07C 9/00309* (2013.01); *H04L 67/02* (2013.01); *H04L 67/025* (2013.01); *G06Q 2240/00* (2013.01); *G07C 2009/00793* (2013.01)

(58) Field of Classification Search
CPC .............. G06F 17/30979; H04L 67/02; G06Q 2240/00; G07C 2009/00793
See application file for complete search history.

(56) References Cited

U.S. PATENT DOCUMENTS

2006/0212566 A1* 9/2006 Boujard ................. G07B 15/04
709/224
2011/0320243 A1* 12/2011 Khan ................. G06Q 20/3278
705/13

* cited by examiner

*Primary Examiner* — Tuan A Pham
(74) *Attorney, Agent, or Firm* — Trueba & Suarez PLLC; Roberto M. Suarez

(57) ABSTRACT

The present invention is a system for intelligently managing parking spaces and facilities. A preferred embodiment of the present invention would include a system comprising one or more parking barrier devices, connected over a network to a system back-end that manages parking space utilization, barrier operation and status, and inputs from one or multiple user applications.

1 Claim, 42 Drawing Sheets

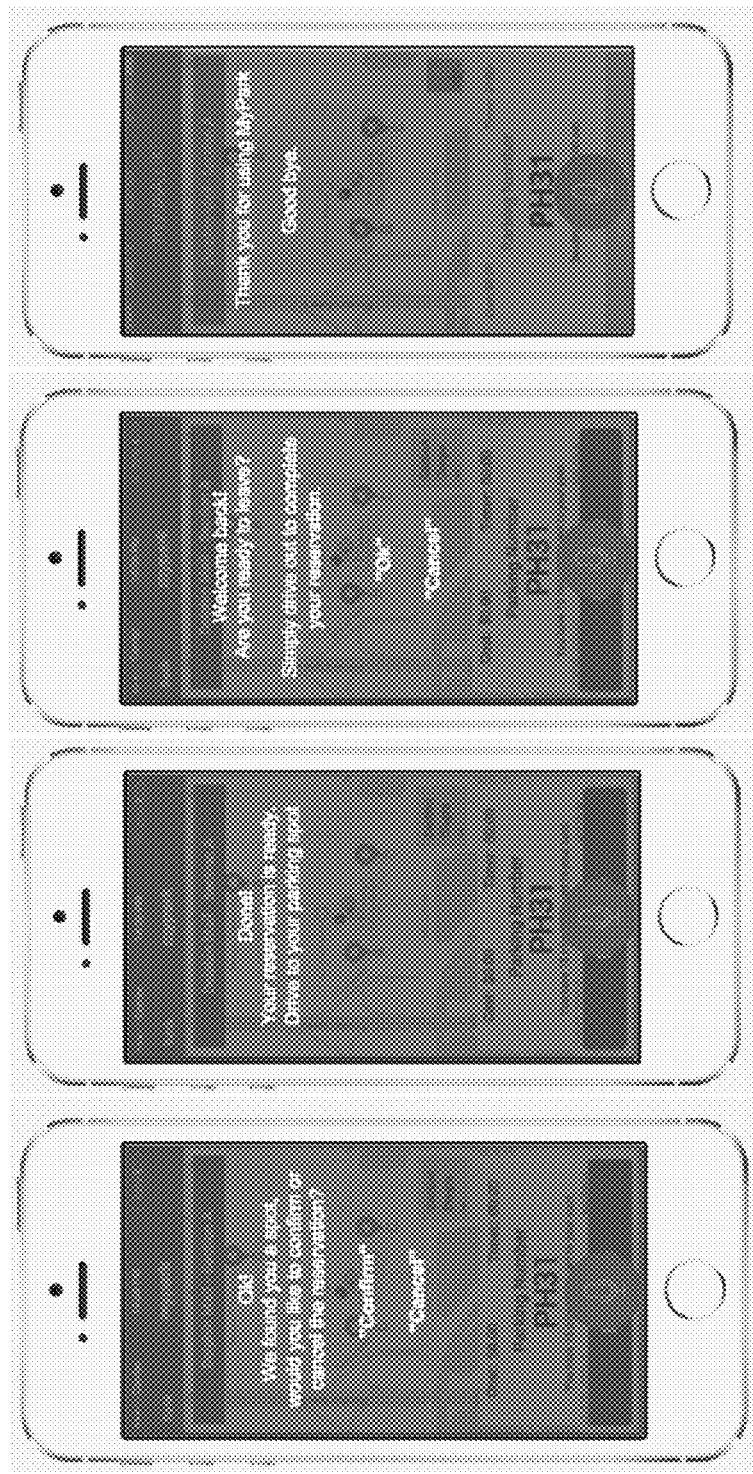

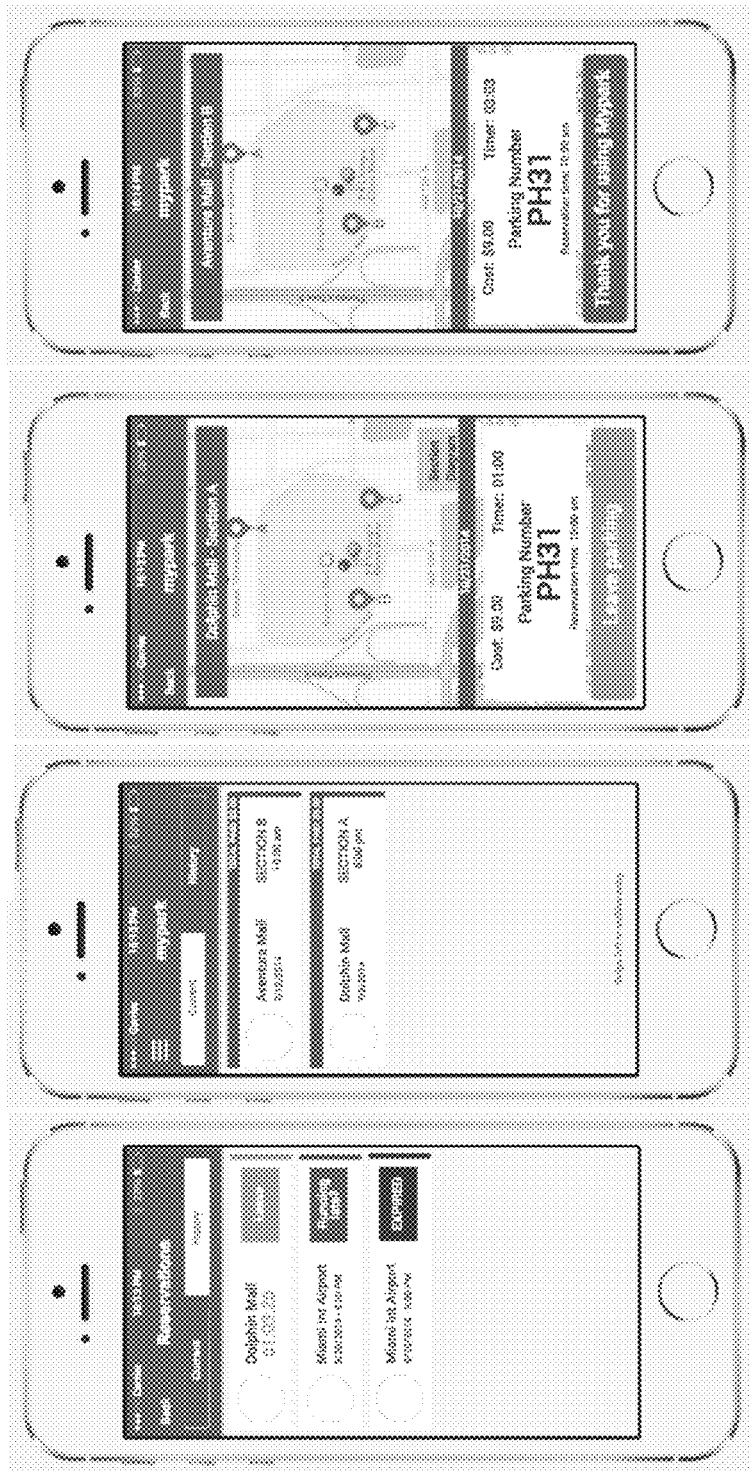

FIG. 41

INTELLIGENT PARKING SYSTEM

CROSS-REFERENCE TO RELATED APPLICATIONS

This non-provisional patent application claims the benefit of the U.S. Provisional Patent Application No. 61/942,344, filed on 20 Feb. 2014, which is incorporated by reference as if fully set forth herein.

STATEMENT REGARDING FEDERALLY SPONSORED RESEARCH OR DEVELOPMENT

Not applicable.

FIELD OF THE INVENTION

This invention relates generally to the field of parking management systems, and, more particularly, to an integrated system, method, apparatus, and service for intelligently managing parking spaces and facilities where the system comprises any one, a combination of, or all of a software application, an Internet portal, and an apparatus.

BACKGROUND

Parking is a hassle. Both from the perspective of the driver looking for a parking space as well as from the perspective of the administrator of the parking facility, the parking experience is tedious, inefficient, and often stressful. Traditionally, the allocation of parking spaces is administered on a first-come first-served basis. Even parking lots that charge a premium for parking find it difficult to manage since they often have to rely on old, often manual, systems.

Parking management systems have traditionally utilized paper tickets. These often have to be validated, but are easily susceptible to being damaged or lost. Cash-based parking facilities are susceptible to theft. In traditionally managed parking facilities there is often no efficient way to control traffic since drivers wander and hunt for a good parking space. This behavior leads to a lot of wasted time and driver frustration. Studies suggest that the average driver in major metropolitan areas spend an average of 20 minutes looking for a space and drive an average of 15 km a month during these searches. Facilities with permit systems usually use a tag-based system that determines that driver's permit, usually by zones. This requires an immense effort and cost on the part of the facility on enforcement and does not lead to an efficient and organized system.

Previous attempts to address the inefficiencies and frustrations described above have been developed in the current state of the art. Many of these have recognized the problem of ticket and cash-based systems. Others have attempted to address the issue by implementing electronic payment systems. Still others have attempted to solve the issue through the use of reserved spaces. Attempts to address the problems found in the current state of the art have been lacking in one element or another.

It would, therefore, be desirable to have the ability to rent and/or reserve spaces ahead of time, with a pre-determined space assignment, that greatly reduces traffic congestion and parking frustration by implementing a fully automatic, intelligent cloud-based system that does not require tickets, tags, or employees. Therefore, there currently exists a need in the industry for a system for intelligently managing parking spaces and facilities where the system comprises any or all of a one or more software application, an Internet portal, and a one or more apparatus to offer a complete and comprehensive solution that does not sacrifice convenience for control but rather greatly increases the user experience of the drivers while at the same time improving the control of the facility administrator.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

In this specification, where a document, act, or item of knowledge is referred to or discussed, this reference or discussion is not an admission that the document, act, or item of knowledge or any combination thereof was, at the priority date, publicly available, known to the public, part of common general knowledge, or otherwise constitutes prior art under the applicable statutory provisions; or is known to be relevant to an attempt to solve any problem with which this specification is concerned.

SUMMARY

Briefly, according to an embodiment of the invention, a system for intelligently managing parking spaces and facilities comprises: a one or more network-connected, mechanized parking barrier device with an integral microcontroller; a one or more network-connected node device with an integral microcontroller; a network-connected computing server and database; a one or more network-connected user interface; and a communications protocol.

In another embodiment, the invention may be practiced as an apparatus comprising a server, a one or more client device that is in communication with the server, a one or more node device that is also in communication with the server, and a one or more parking barrier device that is in communication with the node device.

Generally, one or more parking spaces are configured to accept a mechanized parking barrier device. The mechanized parking barrier device communicates via a system communications protocol to a node device. The node device communicates via the system communications protocol to a remote server, which is, according to an embodiment of the present invention, a specially programmed computer configured to access a system database and run a specialized program. Through a system-provided user interface, users of the intelligent parking system can interact with the remote server, via the communications protocol, in order to find and reserve a parking space. The remote server can then send a series of rules based commands to the node device, which then relays a series of instructions to the parking barrier device assigned to the requested parking space. Alternatively, the remote server can automatically assign an available parking space, according to an embodiment of the present invention.

In this way, the intelligent parking system can accept a user input to pay for and release a parking space by lowering the parking barrier and provide the functionality to rent and/or reserve spaces ahead of time, with a pre-determined space assignment, while greatly reducing traffic congestion and parking frustration by implementing a fully automatic, intelligent cloud-based system that does not require tickets, tags, or on-site employees.

Various other embodiments of the present invention are contemplated to be within the scope of the invention disclosed herein. By way of example, and not limitation, it is contemplated that an embodiment of the invention may comprise a single parking barrier device that is operatively configured to be in communication with a client device. In this embodiment, a single user, for example, may use the invention to control access to their private parking space. In a similar manner, a large parking facility may practice another embodiment of the invention in order to manage, monitor, reserve, and receive payment for multiple parking spaces, lots, and or facilities. In this embodiment, the server would be operatively configured to be in communication with various node devices as well as various client devices. Each of the various node devices, in turn, would be operatively configured to be in communication with various parking barrier devices, each parking barrier device fixedly installed in, and configured to represent to the system, a single parking space.

BRIEF DESCRIPTION OF THE DRAWINGS

These and other features, aspects, and advantages of the present invention will become better understood with regard to the following description, appended claims, and accompanying drawings where:

FIGS. 3 through 24 show exemplary simplified depictions of a mobile application user interface for an intelligent parking system, in accordance with an embodiment of the present invention;

FIGS. 28-54 show exemplary simplified depictions of screens of the Web Application user interface for the intelligent parking system, according to an embodiment of the present invention.

Figure 1:
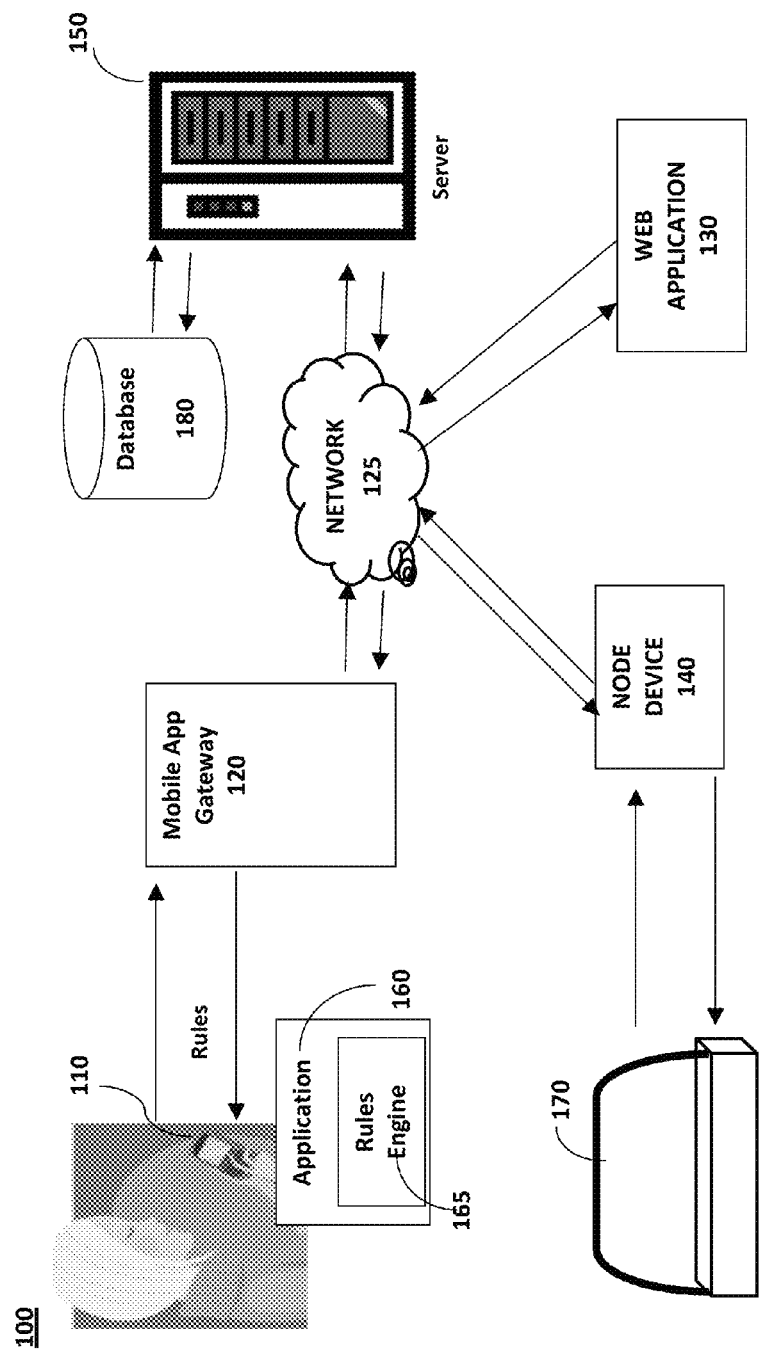
FIG. 1 shows an exemplary simplified depiction of an intelligent parking system in which embodiments of the present invention can be implemented.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DESCRIPTION

In the Summary above and in the Description, and the Claims below, and in the accompanying Drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm, and whose upper limit is 100 mm.

While the specification concludes with claims defining the features of embodiments of the invention that are regarded as novel, it is believed that the invention will be better understood from a consideration of the following description in conjunction with the figures, in which like reference numerals are carried forward.

Apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

We discuss an integrated apparatus, system, method, and service for intelligently managing parking spaces. Customizable rules trigger appropriate responses to translate user interactions on a client device into commands sent to a specific parking barrier. This combination of apparatus, system, method, and service improves upon known solutions to managing parking spaces in that it is scalable from one to multiple parking spaces and, indeed, multiple parking lots and locations. The computational burden of monitoring, reserving, selling of reservations, and triggering of commands is placed on a centralized server, not on the parking barrier itself, nor on the parking facility itself.

Intelligent Parking System.

Referring now to the drawings in general and to FIG. 1 in particular, there is shown a simplified illustration of an intelligent parking system 100 in which embodiments of the present invention can be implemented. In this exemplary embodiment, a system 100 for intelligently managing parking spaces and facilities is shown where the system comprises: a software application 160 running on a client device 110; a mobile application gateway 120 providing services connecting the mobile application running on the client device 110 to a Server 150 through a Network 125, where the server processes operations to and from a database 180; a Web Application 130 provided by the Server through the Network 125; a one or more Node Devices 140 operably connected to the server through the network; and a one or more parking barrier devices 170 operably connected to the one or more Node Devices.

The system provides one or more benefits and advantages not previously offered by the prior art, including, but not limited to, the ability for facility owners and managers to control, charge and monitor the use of their parking spaces within one or multiple facilities with ease of use and efficiency, as well as enabling individual users of the system to use the system to control private parking spaces as well as having the ability to use the system to rent their private parking spaces to other users of the system.

The system comprises several components that can be utilized individually or in combination. Embodiments of the invention comprise components such as a computer application, a physical barrier device, a node device, and a system backend, which comprises a series of pre-programmed instructions executed on a special purpose computer and accessible via a connected network.

Parking Management Service.

Figure 2A:
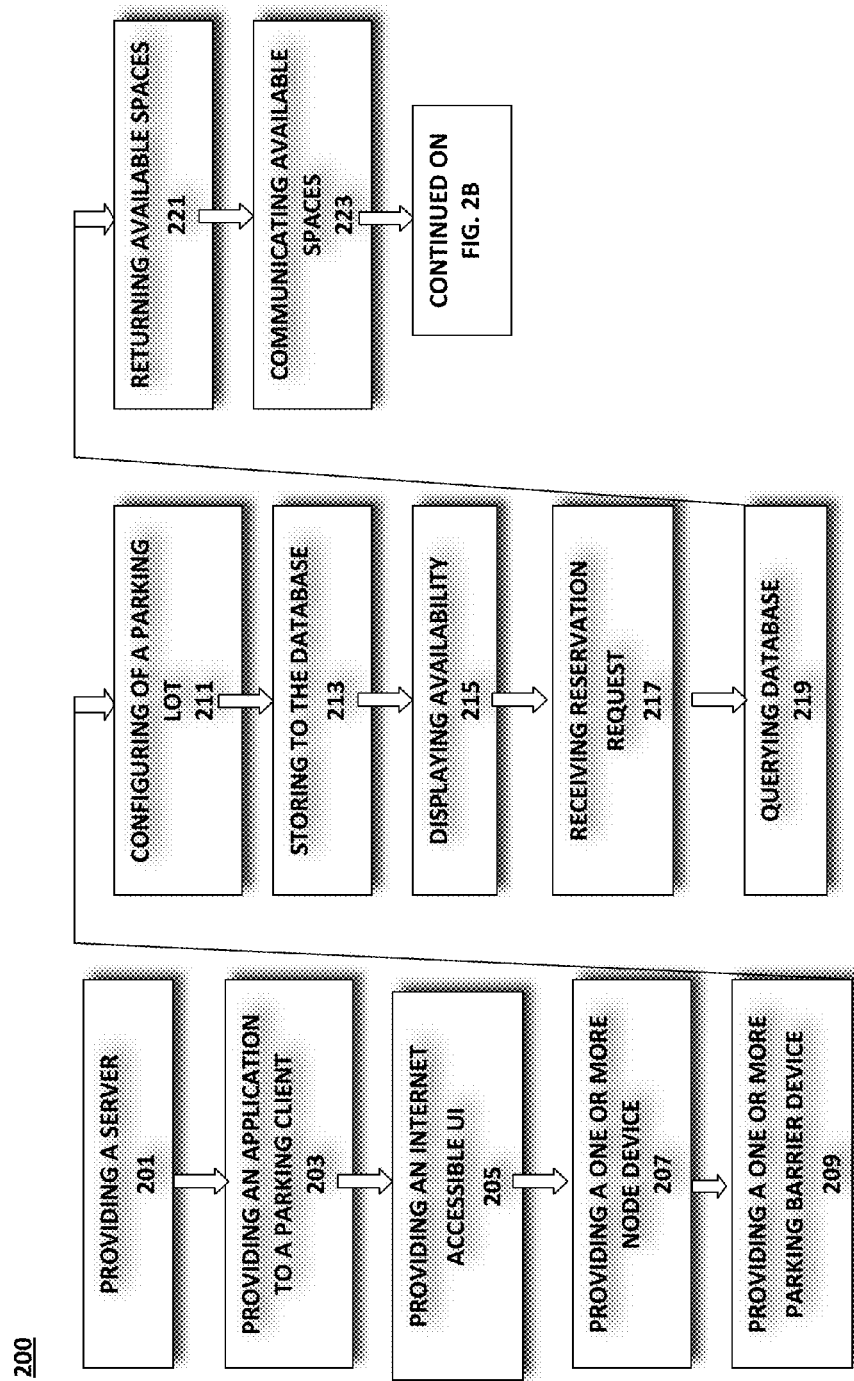
FIGS. 2A and 2B is a flowchart of a method for providing an intelligent parking system service, in accordance with an embodiment of the present invention.
Figure 2B:
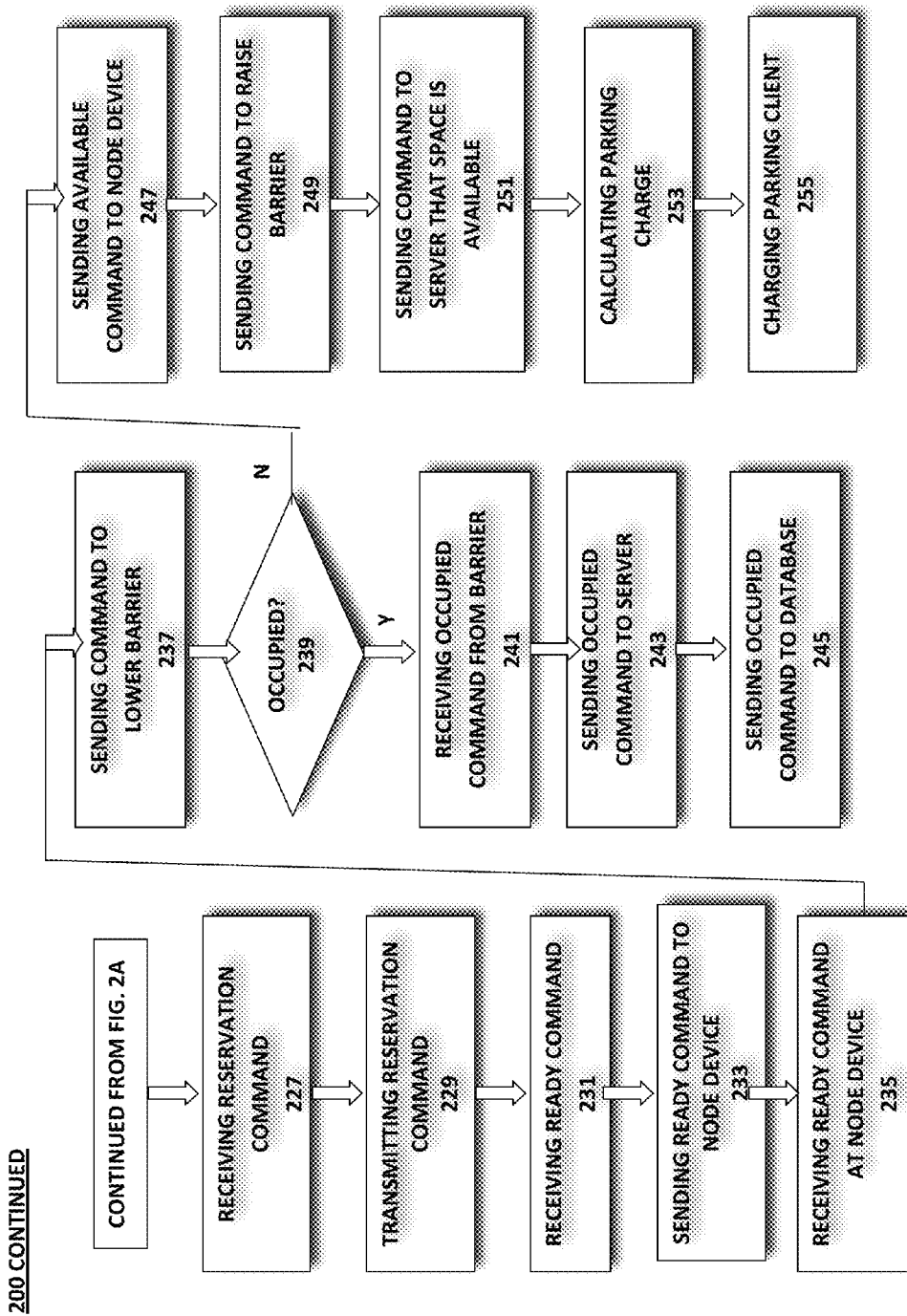
Figures 3, 4, 5, 6:
Figures 7, 8, 9, 10:
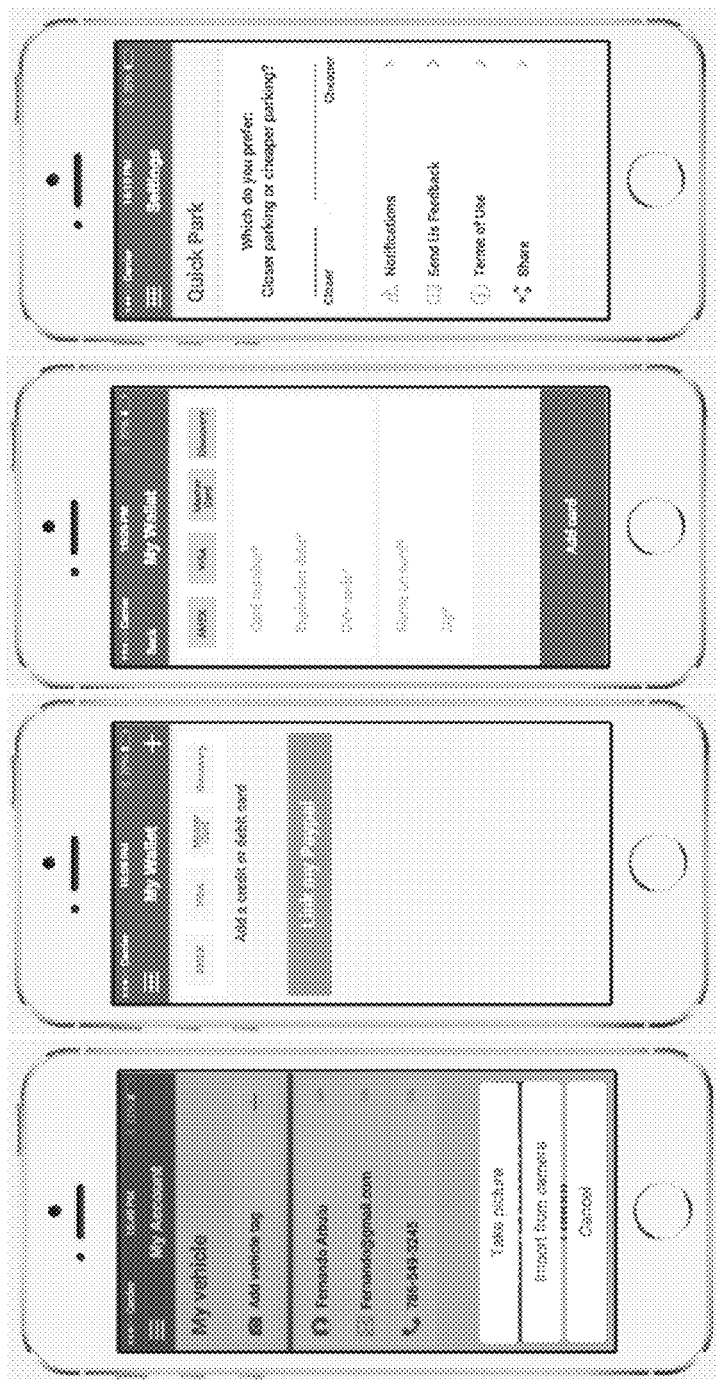
Figures 11, 12, 13, 14:
Figures 23, 24:
Figure 25:
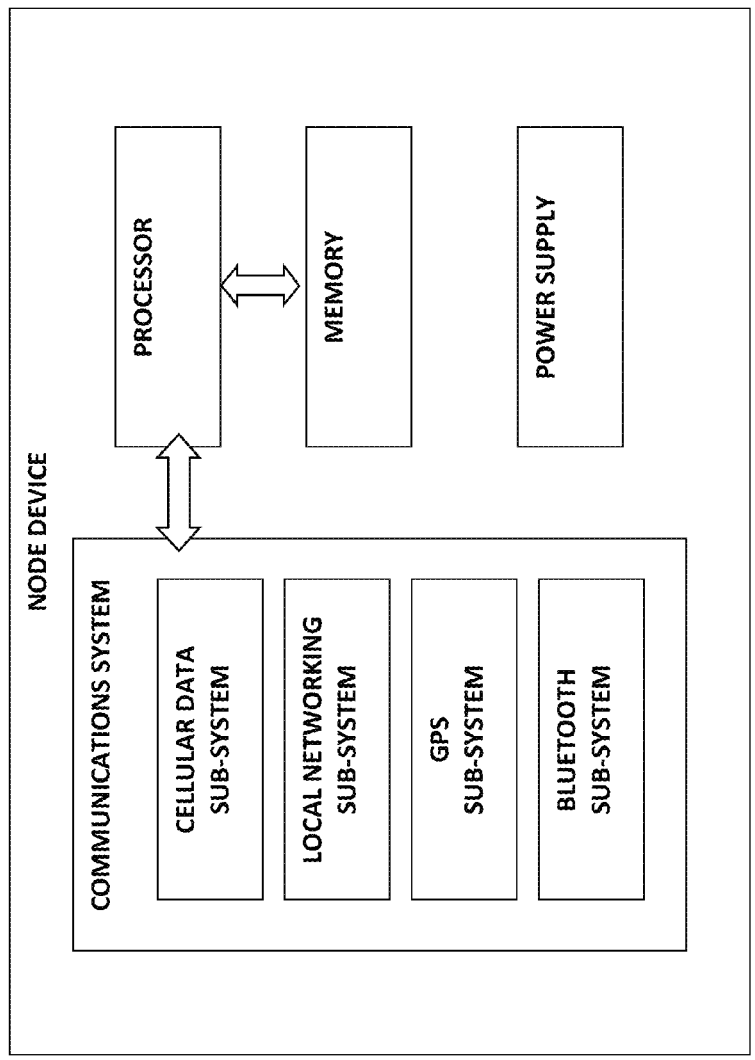
FIG. 25 shows a simplified block diagram of the Node Device of the intelligent parking system, according to an embodiment of the present invention.

Referring now to FIGS. 2A and 2B, we discuss an embodiment of the invention as a method for providing a parking management service. In this embodiment, a server is provided 201, which is operatively configured to send and receive commands and instructions to and from a database.

Additionally, an application 203 is provided to a parking client. The application may be a mobile application, web-based application, or other instruction set configured to be executed by a microprocessor. This application is operatively configured to provide an instruction set to a client device thereby rendering the client device to be communicatively operative with said server. By way of example, and not limitation, would be a mobile application that is loaded onto a parking client's smartphone where, through the smartphone's networking capabilities, the mobile application is able to be in communication with the server.

The method further provides an Internet accessible user interface that is in communication with the server and is operatively configured to send and receive operations to and from the database 205. By way of example, and not limitation, this may be accomplished by providing a web-accessible application that provides a user interface to the server and database. This would be known as the service "back-end" that is accessible and used by the parking facility management.

The method further provides a one or more node device that is in communication with the server 207. One or more than one node device may be provided depending on the size and configuration of the parking lot and the number of parking spaces to be managed.

The method further provides a one or more parking barrier device that is in communication with said node device, wherein each said parking barrier device is fixedly attached to a single parking space 209.

The method further provides means for the configuring of a parking lot via operations executed on the Internet accessible user interface 211 and for storing to the database a set of configuration parameters for said parking lot 213.

The method further provides the ability to display on said application availability of said parking lot 215. In this way, a parking client can access the server and query available parking lots utilizing the parking management service via, for example, the mobile application running on the parking client's smartphone.

The method further provides for the receiving by the server a request from the application to reserve a parking space at said parking lot 217.

The method further provides for the querying of the database by the server as to the availability of parking spaces at said parking lot 219 and the returning by the database to the server information about available parking spaces 221. The server then communicates said available parking spaces by the server to the application 223. In this way, a parking client can access the server and query available parking spaces at a desired parking lot via, for example, the mobile application running on the parking client's smartphone.

The method further provides receiving from the application a command to reserve the parking space by the server 227. The server then transmits a parking reservation command to the node device associated with the reserved parking space 229.

When the parking client has arrived at the parking lot and is ready to park, the service is able to provide a location and, in some embodiments, spoken or visual directions to their reserved parking space. When the parking client has reached the space and is ready to enter the parking space, they will input the command into the application. The server will receive from the application a command that indicates that the parking space is ready to be occupied 231. The server will send a command 233 to the node device, and the node device will receive the command 235, indicating that the parking space is ready to be occupied. The node device will then send a command to the parking barrier device assigned to the reserved parking space to lower the parking barrier 237, thereby allowing the parking space to be occupied.

The method further provides sensing means integral to the parking barrier device to discern if the space is still occupied 239. This sensing means may be accomplished by many methods known in the art including, but not limited to proximity sensors, infrared sensors, pressure switches, mechanical relays, and the like.

If the sensing means determines that the space is still occupied, the method provides for receiving a command from the parking barrier device by the node device that the parking space is now occupied 239. The method then sends a command from the node device to the server that the parking space is now occupied 241. The server then sends a command to the database to indicate that the parking space is now unavailable 245.

If the sensing means determines that the parking space is no longer occupied, as when a parking client leaves the parking space, the method provides for sending a command from the parking barrier device to the node device that the parking space is now available 247. The node device then sends a command to the parking barrier device to raise the parking barrier 249, thereby blocking the parking space from being occupied. The method further provides for sending a command from the node device to the server that the parking space is now unoccupied 251 and for sending a command from the server to the database to indicate that the parking space is now available.

The method further provides for calculating, by the server, a charge amount based upon the parking lot configuration 253 and then charging client a fee for the parking service 255.

End-User Interface Application 160.

The end-user in this system is the person wishing to reserve and park in an intelligently managed parking space. The end-user interacts with the system via a User Interface. A preferred embodiment of this user interface is a Mobile Application programmed to be accessible and executed by a microprocessor running on a client device, such as a smartphone. FIGS. 3-24 show example screens of the user interface for an end-user to interface with the Intelligent Parking System, according to an embodiment of the present invention. By navigating the easy to use graphical interface, the user is directed to select a desired parking location. Through database operations communicating through mobile network protocols, as is known in the art, the mobile application receives available parking data from the Server and displays reservation and payment prompts to the user via the user interface.

Referring generally to the drawings, an embodiment of the invention contemplated to be carried out on a parking client's electronic computing device, comprises a computer-implemented method to reserve, pay, and access a parking space. A special purpose computing device configured to execute a pre-programmed set of instructions for carrying out said method would be user friendly, incorporating such elements as guiding the user to their space and remembering where the user parks most. Embodiments of the invention may give users access to an electronic storefront (see, for example, FIG. 3 and FIG. 9) where users can purchase parking units and accessories, and can also purchase and give parking gift cards to other users of the system. Further embodiments of the invention would enable users to create an account, (see FIG. 3 and FIG. 7) have access to all available participating garages, spaces, and prices (see FIG. 4). Users may further search by proximity to the user, address, landmark or name of facility. It is contemplated that embodiments of the invention would also comprise slide-out menus that provide the user with access to all parts of the application from any other part of the application (see FIG. 5). The same computer method can be used to register individual units within the system and modifying that unit's particular preferences in order to maximize control over each parking space. The computer is able to scan or otherwise identify the unit's unique ID in order to expedite the registration process.

In this exemplary embodiment, the client device is represented as a smartphone because of its widespread use and familiarity; however, one with knowledge in the art will appreciate that a client device can include, inner alia, a tablet computer, a laptop, a desktop computer, or a mobile phone.

In this embodiment, a user interfaces with a Mobile Application loaded onto the client device and communicates with a web server to log in to the system, verify user credentials, and identify parking locations participating in the intelligent parking system service. Communication with the Server can be enabled by a Mobile App Gateway means as is commonly known in the art.

Node Device 140.

The Node Device 140 is an apparatus that is co-located in the vicinity of the parking barrier device 170. According to an embodiment of the present invention, a Node Device comprises a processor, a storage medium, a power supply, and a communications system. One skilled in the art will recognize that the processor may be embodied as a single microprocessor, a series of microprocessors, or a set of software instructions configured to carry out the functions of a microprocessor. One skilled in the art will also recognize that the storage medium may be fixed or volatile, transitory or non-transitory memory and may be accomplished by any means as is known in the art including, but not limited to flash memory, physical storage devices, or cloud-based storage. The power supply may be accomplished via a hard-wire connection to electrical power, as in one embodiment of the present invention. Alternatively, the power supply may be accomplished via a rechargeable battery pack, such as a lithium-ion battery pack, according to an embodiment of the present invention. One skilled in the art will recognize that the communications system may be accomplished by many means known in the art, including one of, or a combination of, wired or wireless network communications, cellular data communications, Bluetooth communications, ZigBee, and GPS, among others.

Figure 55:
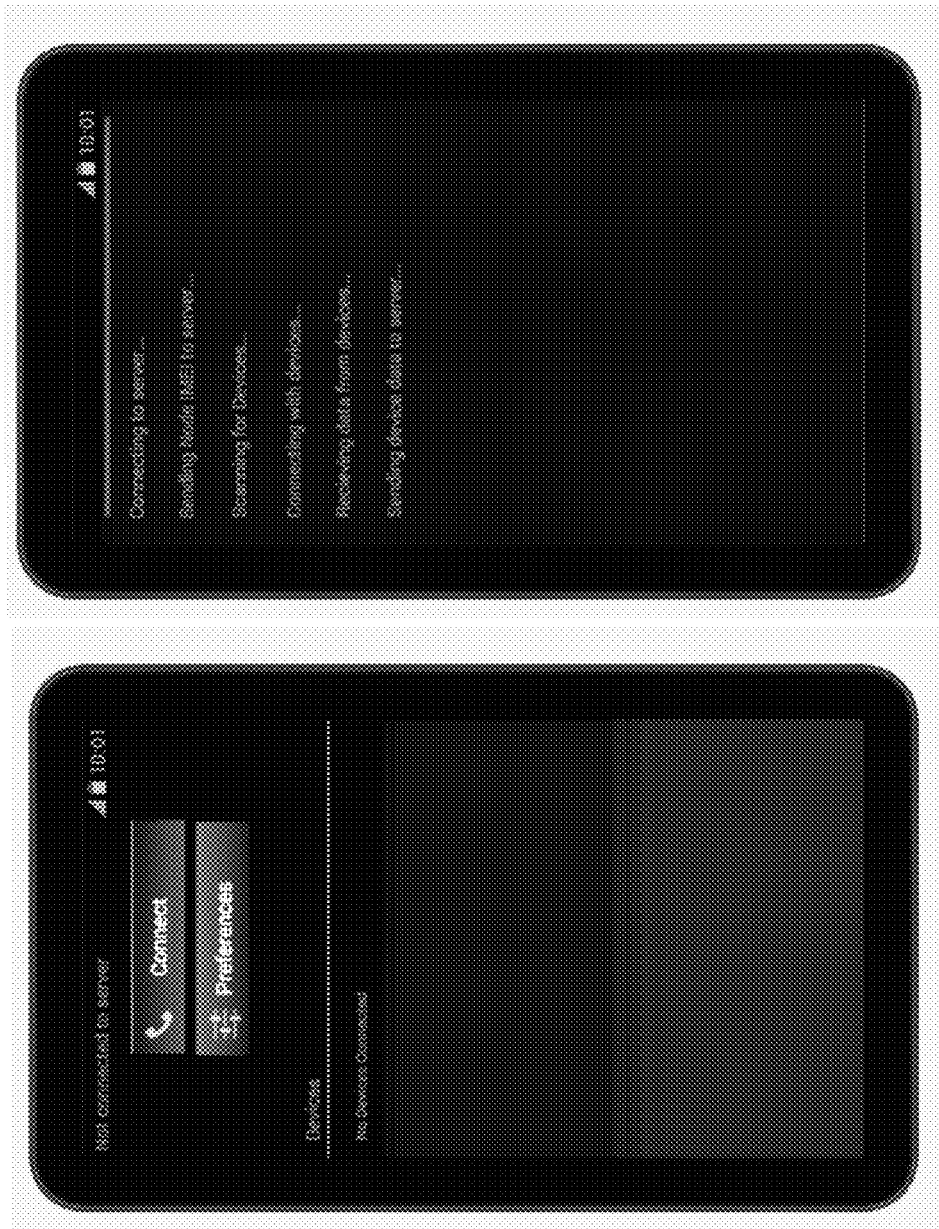
FIGS. 55-57 show exemplary simplified depictions of screens of the Node Device user interface for the intelligent parking system, according to an embodiment of the present invention.
Figure 56:
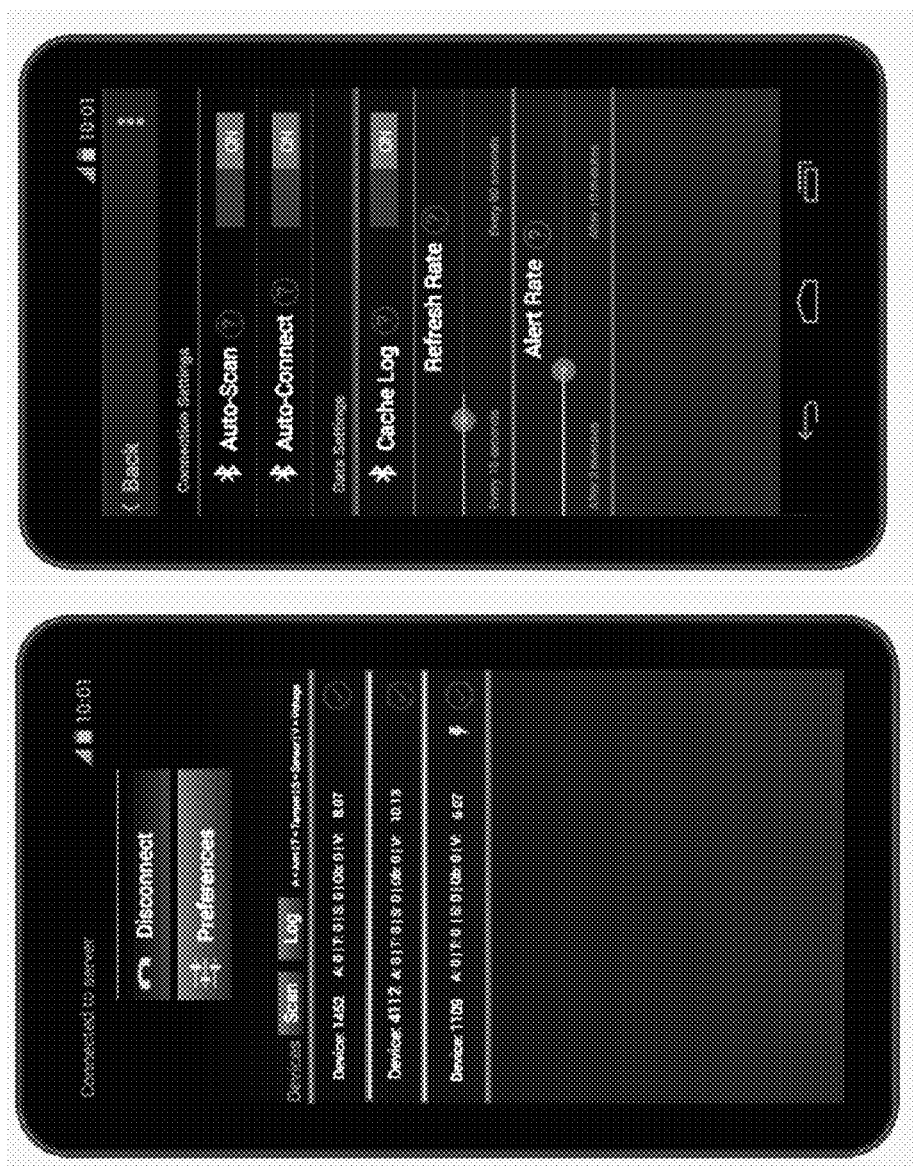
Figure 57:

A parking lot may have one or more than one Node Device. The number of Node Devices is chosen on a lot-by-lot basis as determined by the size of the lot, the number of physical barrier devices, and the optimum operative range of the communication method used to connect the parking barrier devices with the Node Device. One skilled in the art will appreciate the Node Devices and parking barrier devices may be communicatively connected via wired or wireless methods. The method chosen will dictate the maximum operable distance between Node Device and parking barrier device. In addition to communicating with the parking barrier device(s), the Node Devices communicate, wired or wirelessly, with other Node Devices, with the Server, and with the Internet. Referring now to FIGS. 55-57, there are shown example screens of the Node Device user interface for the intelligent parking system, according to an embodiment of the present invention. This node device user interface is accessible via standard network communications, as per one embodiment of the present invention, or through a user interface provided by the Server 150, as according to another embodiment of the present invention.

In a further embodiment of the present invention, the Node Device may be configured to communicate directly with a client device that comes within its communication range. By way of example, and not limitation, it is contemplated to be within the scope of the invention that a node device utilizing a wireless communication protocol, such as Bluetooth, may recognize that a Bluetooth-enabled client device running the mobile application has come within networking range. The Node Device and mobile application could perform an automated handshake subroutine, authenticating the client device and connecting it to the Node Device. In this way, the client device, via the mobile application user interface, may receive specialized instructions, parking information, promotional offers, or location instructions.

Another embodiment of the present invention includes a Node Device that provides a graphical user interface for troubleshooting and direct administration of a Node Device. Referring now to FIGS. 55-57, there are shown example screens of the Node Device user interface for the intelligent parking system, according to an embodiment of the present invention.

Server 150.

The Server 150 is a computer system that is operatively coupled with a communications infrastructure and is able to read from and write to a database 180. Some, or all, of the Server functions may be implemented as computer program processes (software) that is tangibly stored in a memory that perform their respective functions when executed. The server, operably configured with software, enable the parking facility owner to configure, monitor, and generally manage all aspects of running a parking facility. Through network communications 125, as is commonly known in the art, the server is operatively coupled to other components of the intelligent parking system such as client devices 110, node devices 140, network accessible cameras, and future devices, features, and applications as may be developed over time. The server, running the software application, offers to the parking facility a centralized system, that is 100% scalable, flexible, upgradable, and secure. The server application supports e-commerce transactions and automated billing. All e-commerce functions are protected by a certificate and are located behind a password-protected firewall.

Web Application 130.

Another embodiment of the present invention comprises an Internet-accessible portal, or system back-end provided via a Web Application 130. Said portal would be configured to allow for facility management and administration activities such as, but not limited to, user permissions and privileges, pricing and fare management, and complete management and control over each space and its use. In another embodiment of the present invention, the system may further comprise a method of providing a user with location-aware advertisement based on the location of the reserved space or the user. One example of such an application is a user reserving a space at a shopping mall and receiving special offers for stores near their parking space.

The Server 150 generates a graphical user interface featuring easy-to-navigate screens, using pages programmed in, for example, HTML5/CSS3/JavaScript on the front-end. The back-end, for example, uses Linux, Apache Web Server, MySQL database, Perl, Python, PHP, or other commonly used tools running on the Server. Referring now to FIGS. 28-54, there are shown example screens of the Web Application 130 user interface for the intelligent parking system, according to an embodiment of the present invention. By navigating the easy-to-use graphical user interface, the user is directed to set up and configure parking facilities, parking lots, spaces, billing rates and rules, and other aspects of managing a parking facility. The web application allows for user management and lot management, as well as receiving various reports and alerts from the various components of the system. In certain embodiments, a live feed is also available, which provides a real-time stream of network-connected video cameras located throughout the parking facility.

The Physical Barrier Device.

Figure 27:
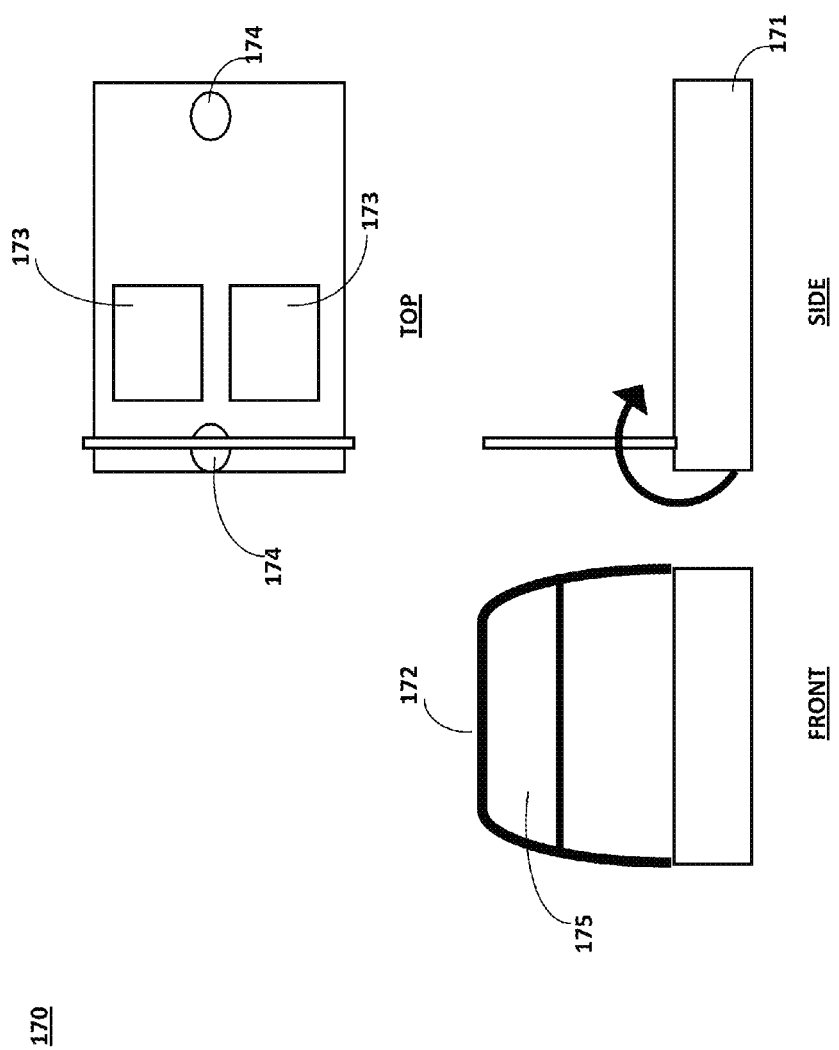
FIG. 27 shows a simplified representation of the parking barrier device component of the intelligent parking system, according to an embodiment of the present invention.
Figure 28:
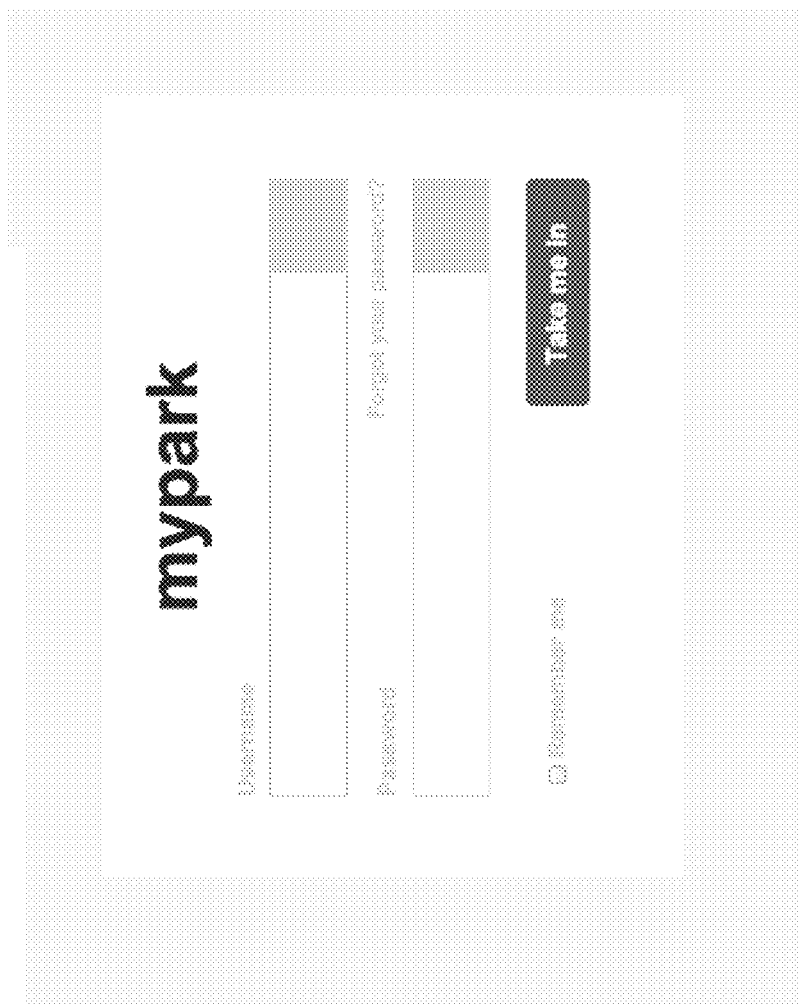
Figure 29:
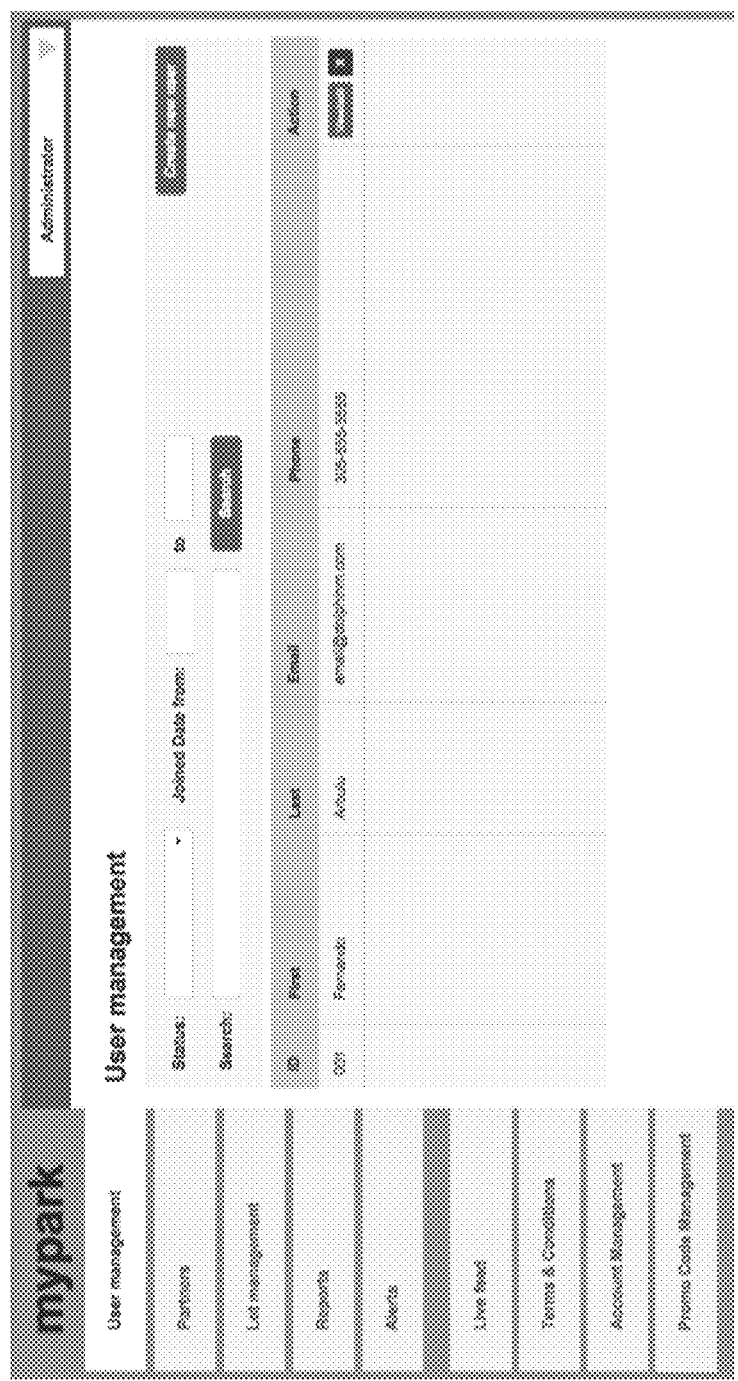
Figure 30:
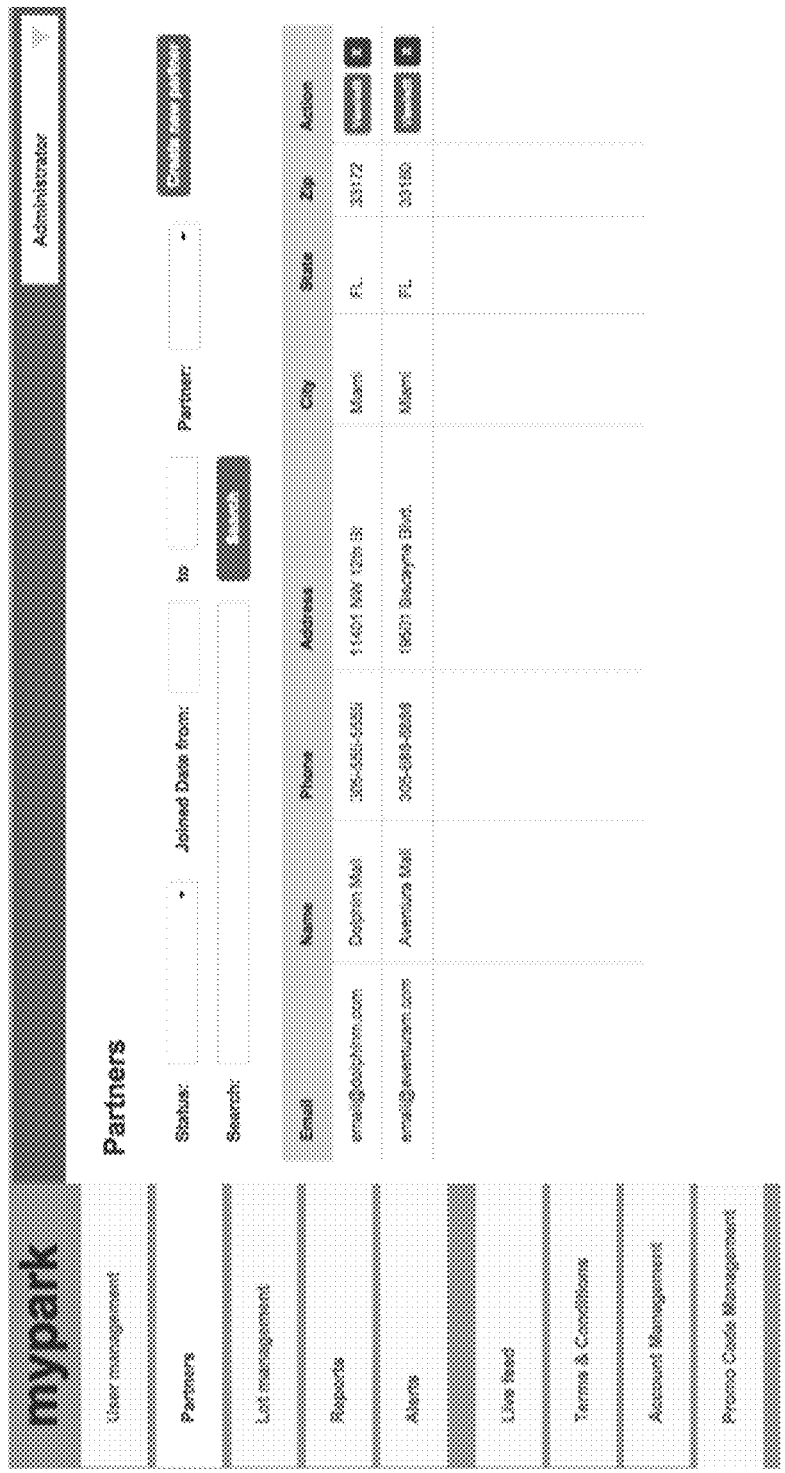
Figure 31:
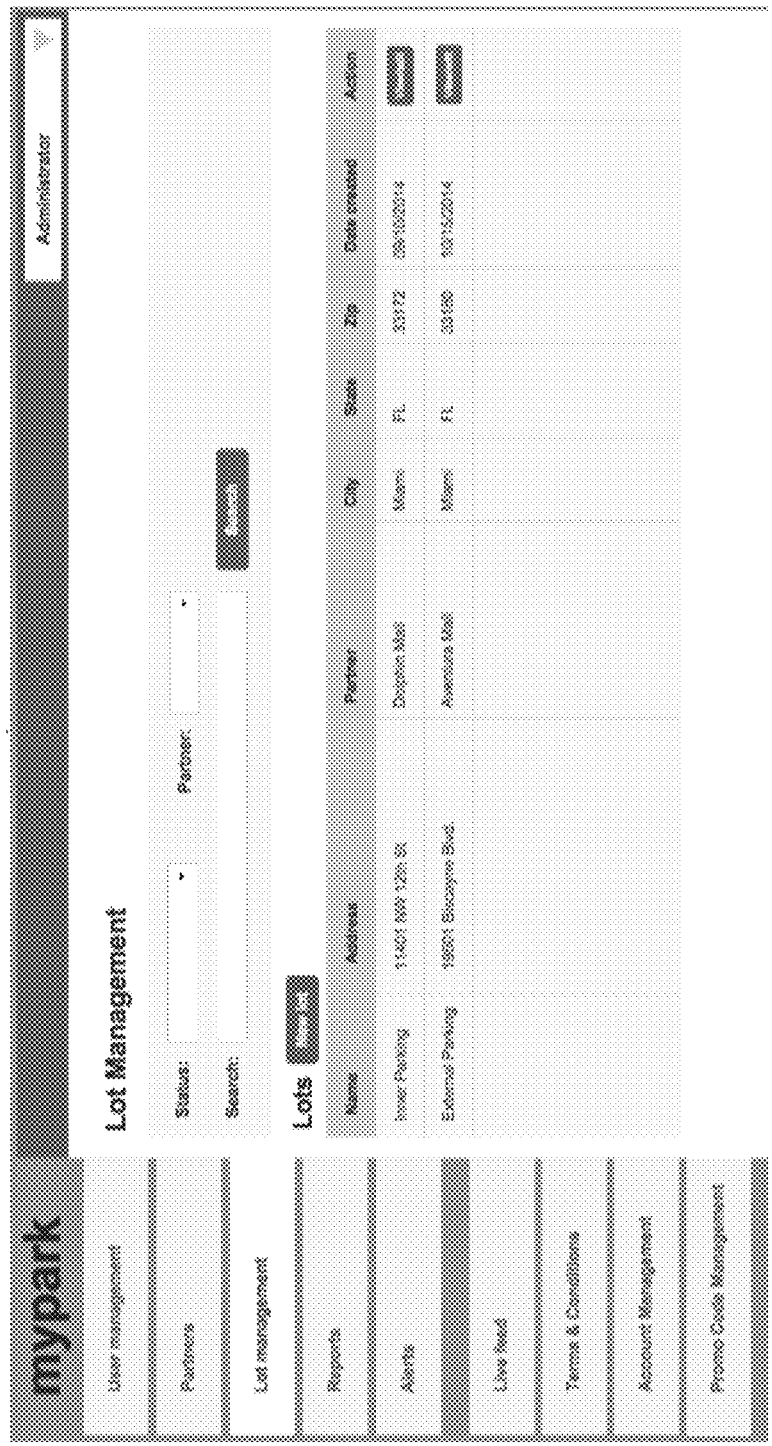
Figure 32:
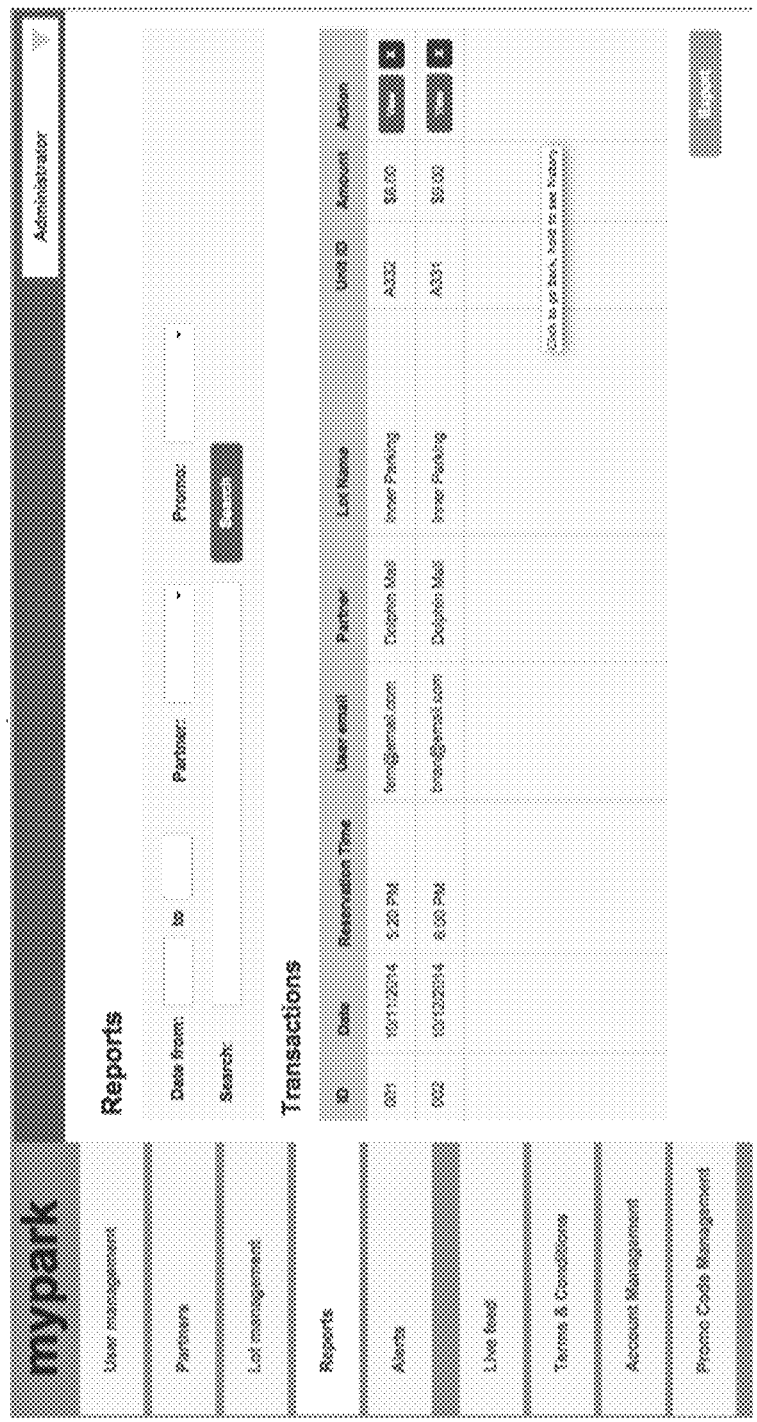
Figure 33:
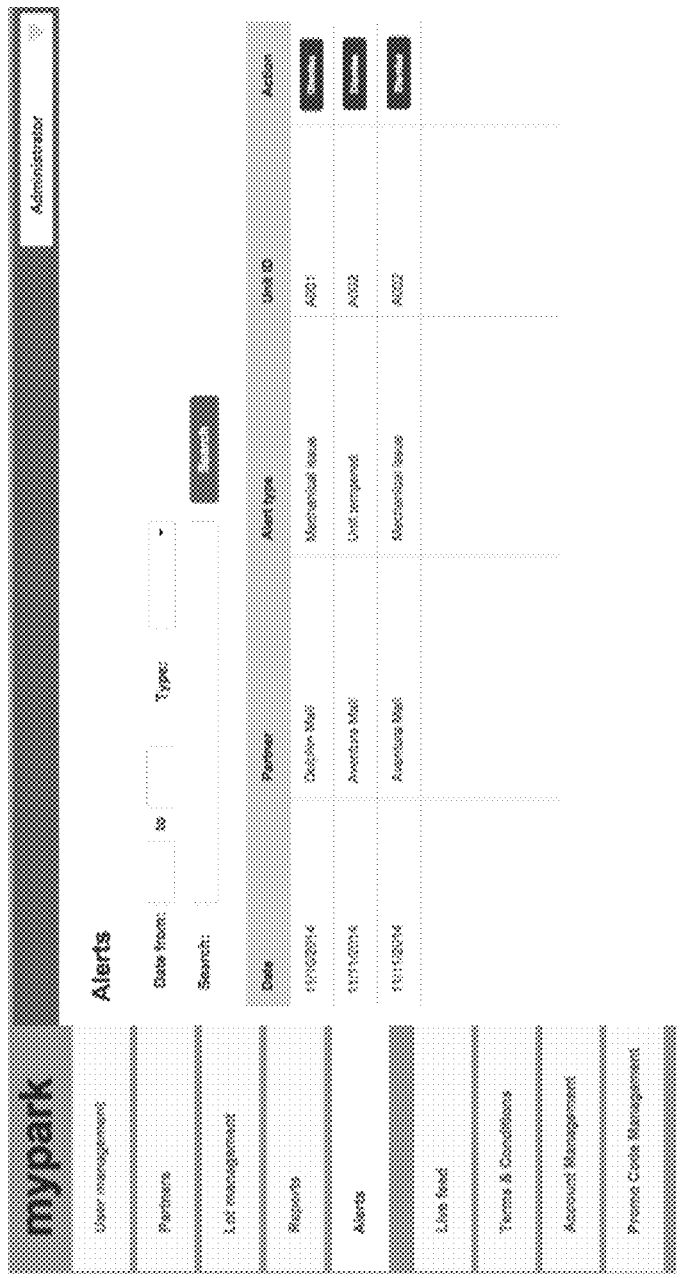
Figure 34:
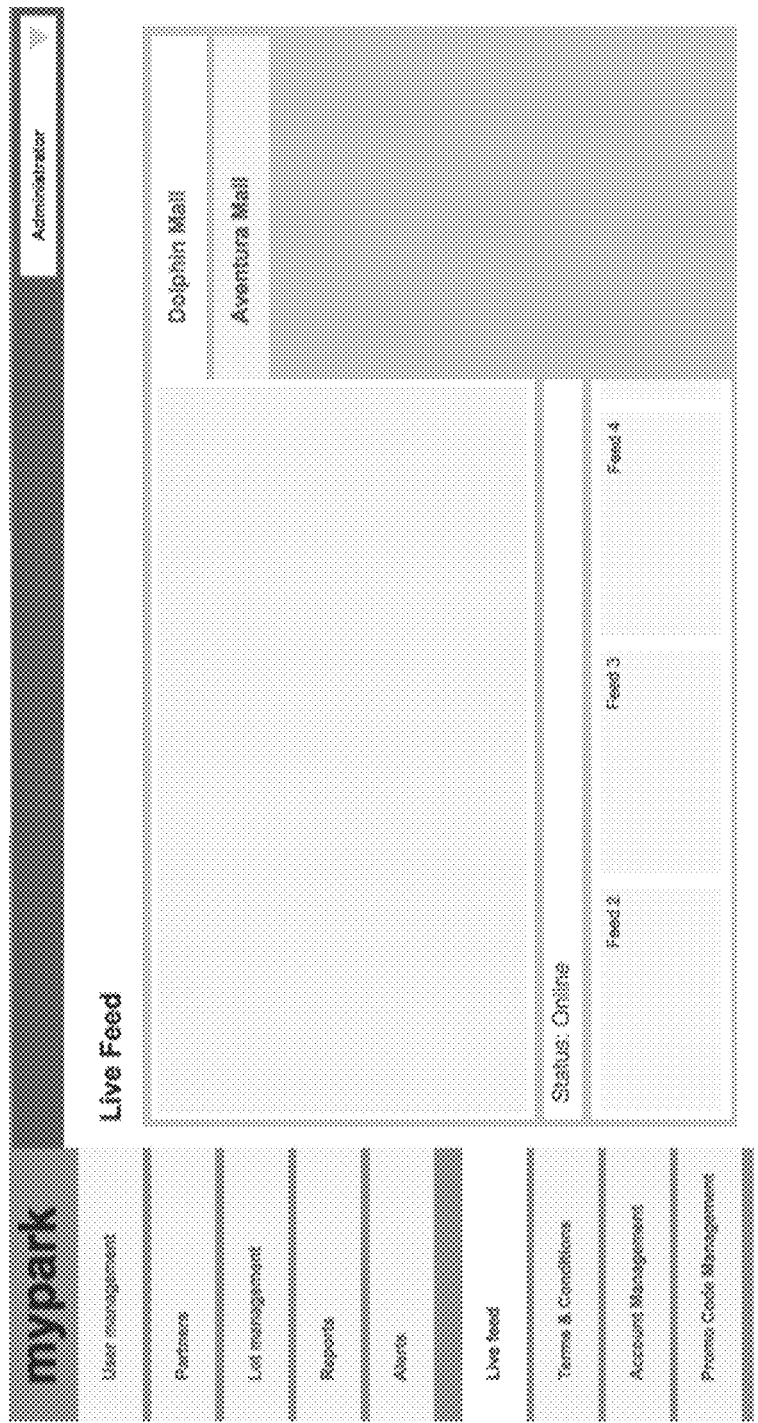
Figure 35:
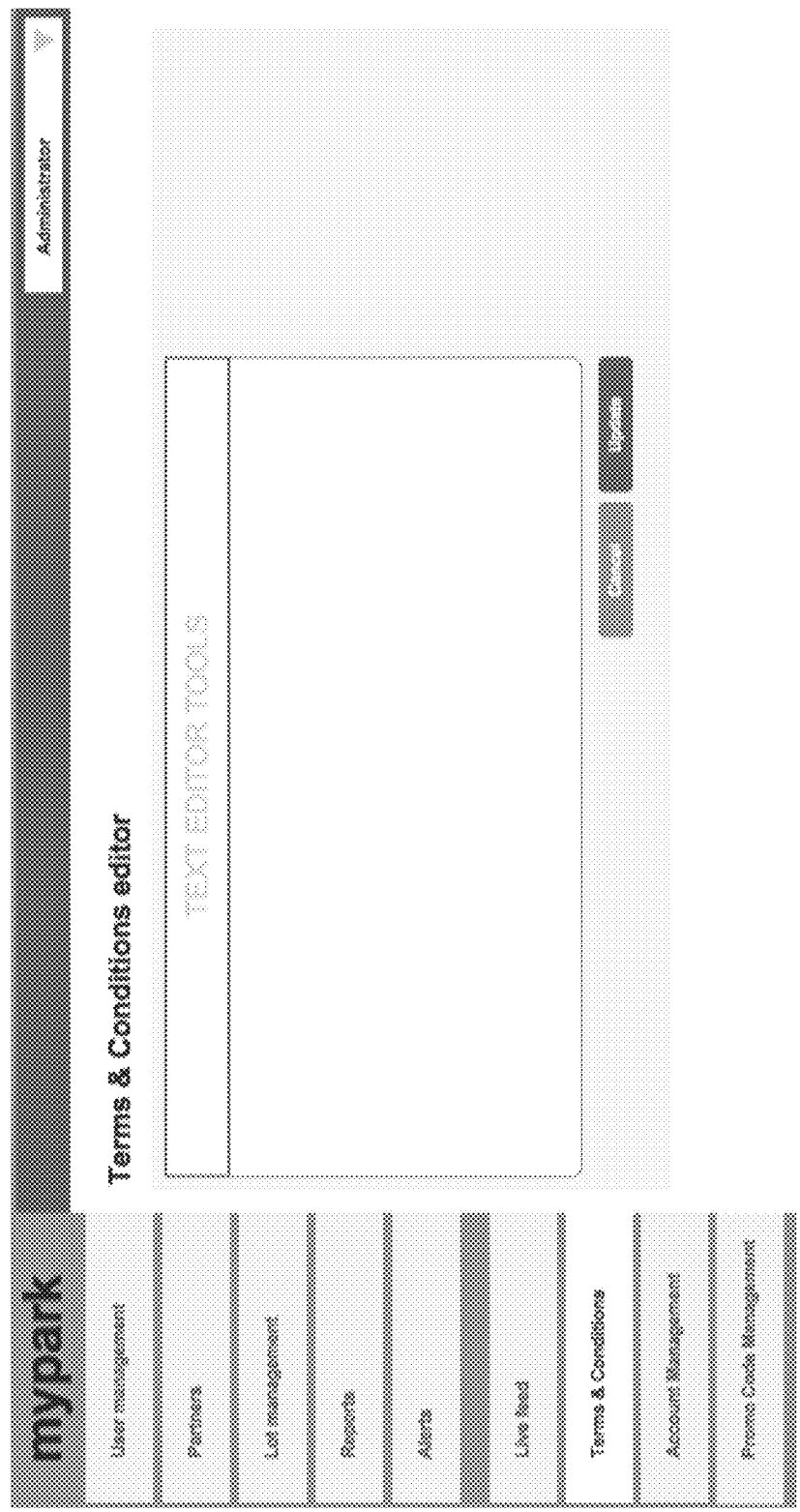
Figure 36:
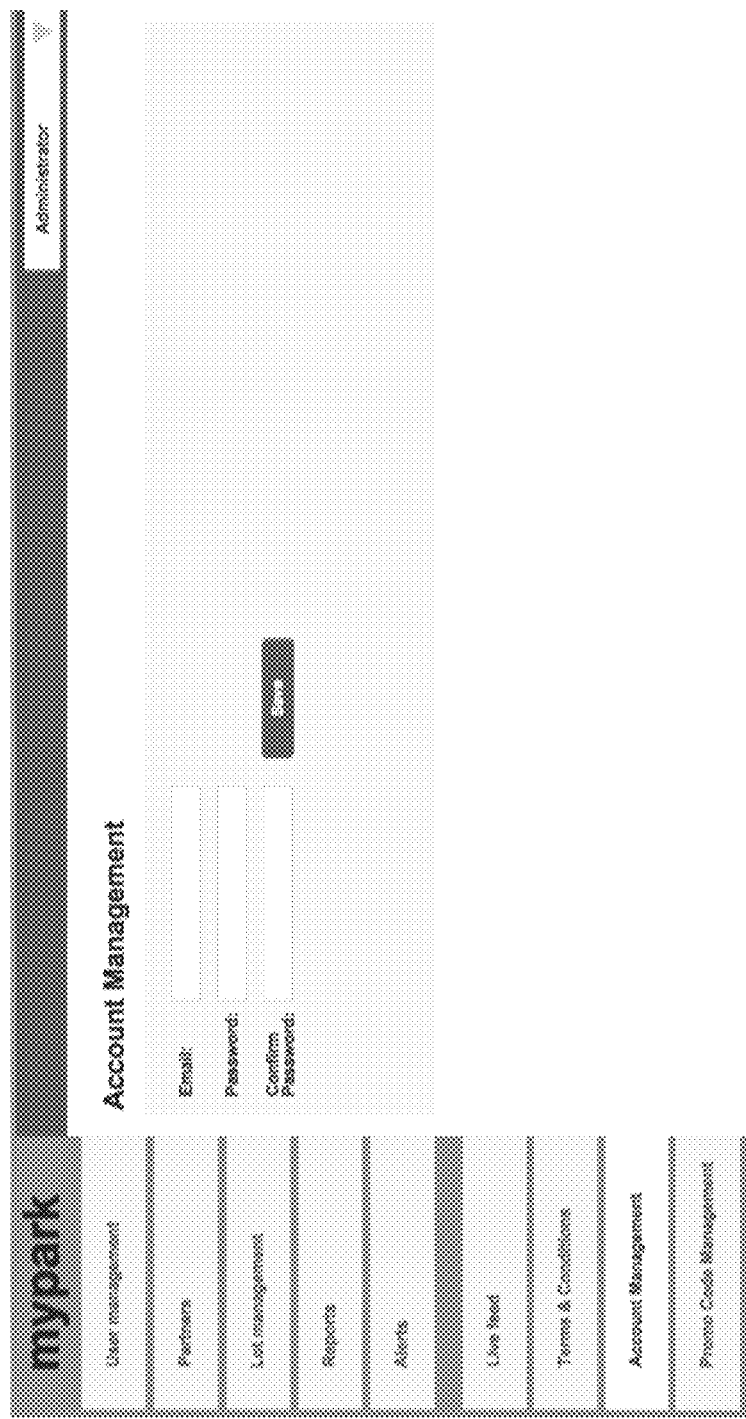
Figure 37:
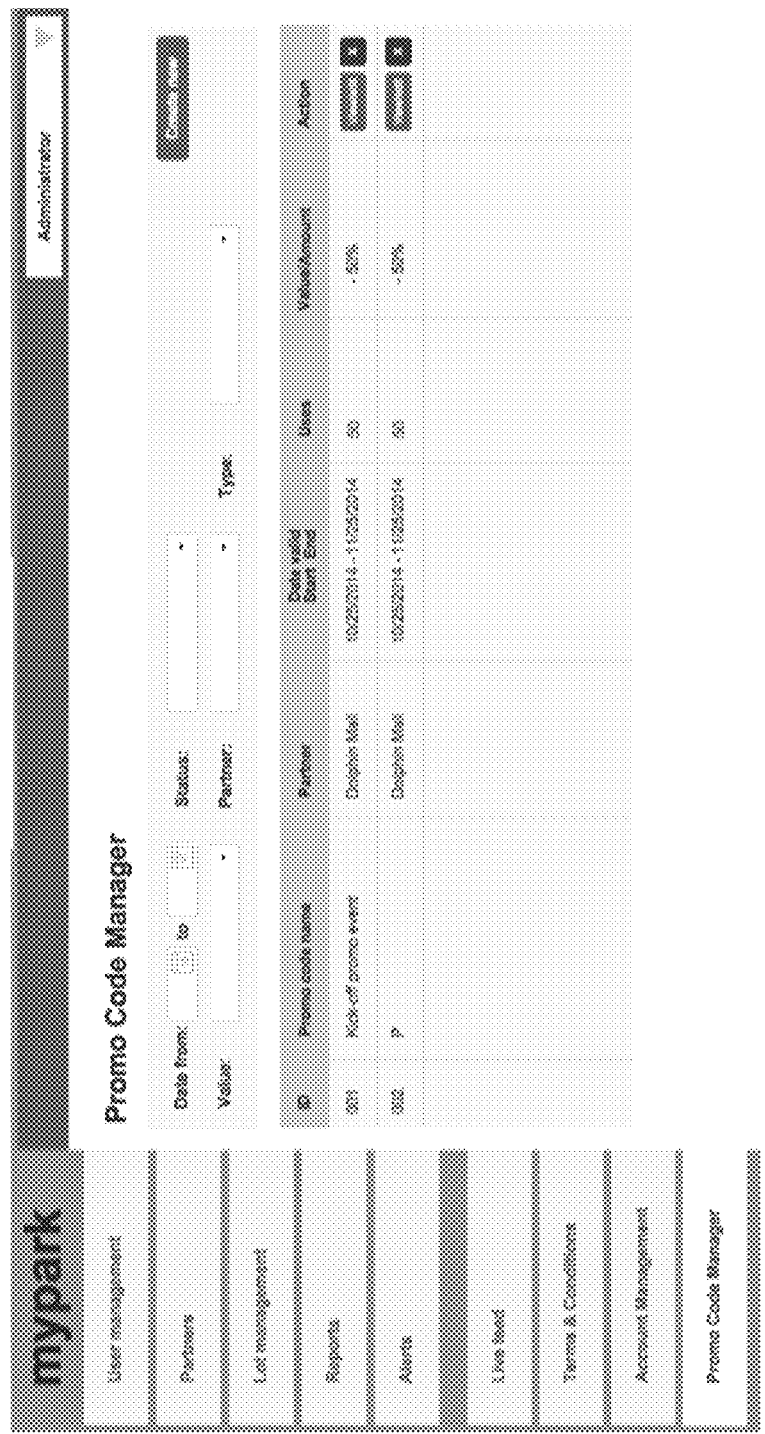
Figure 38:
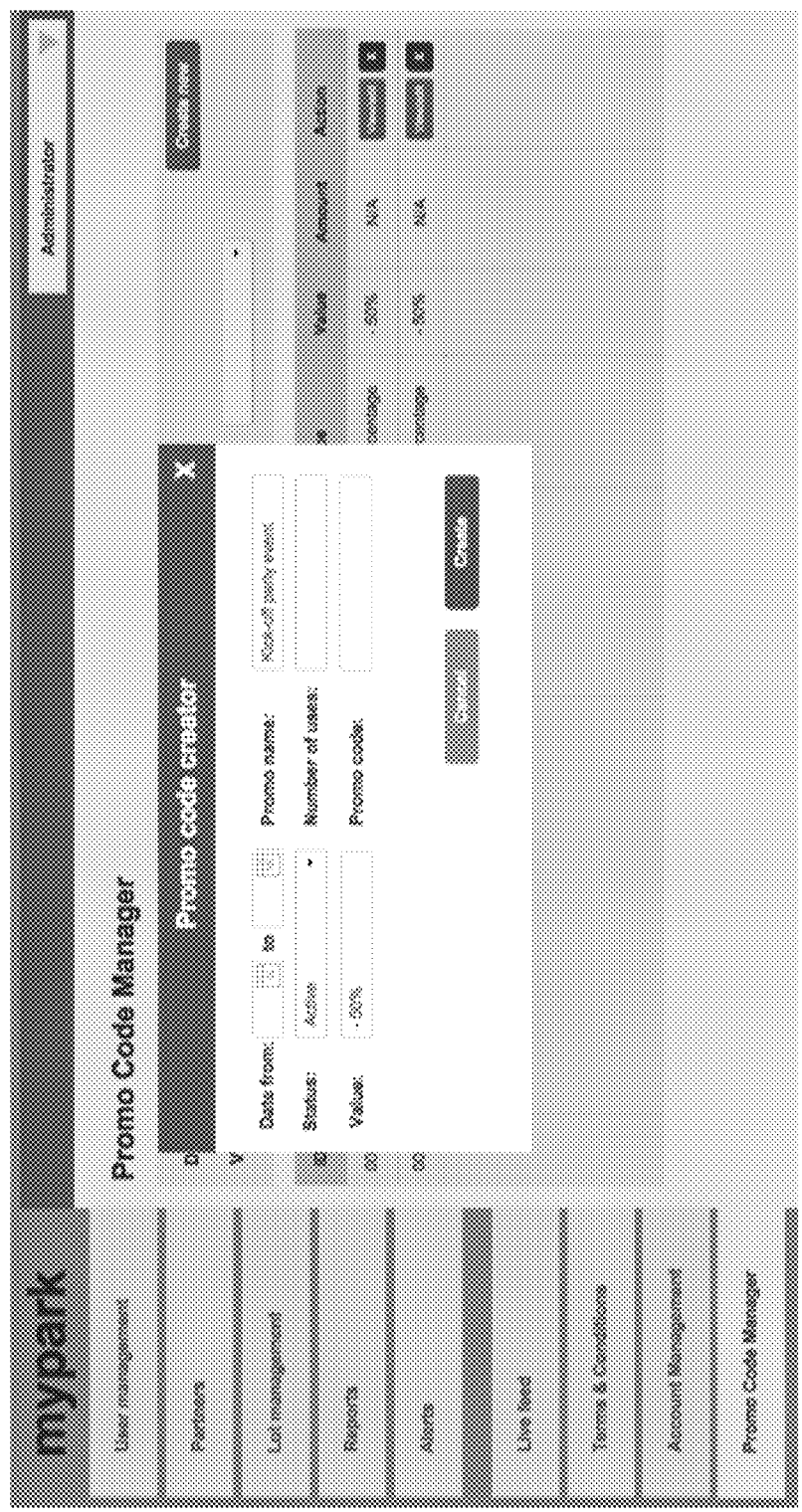
Figure 39:
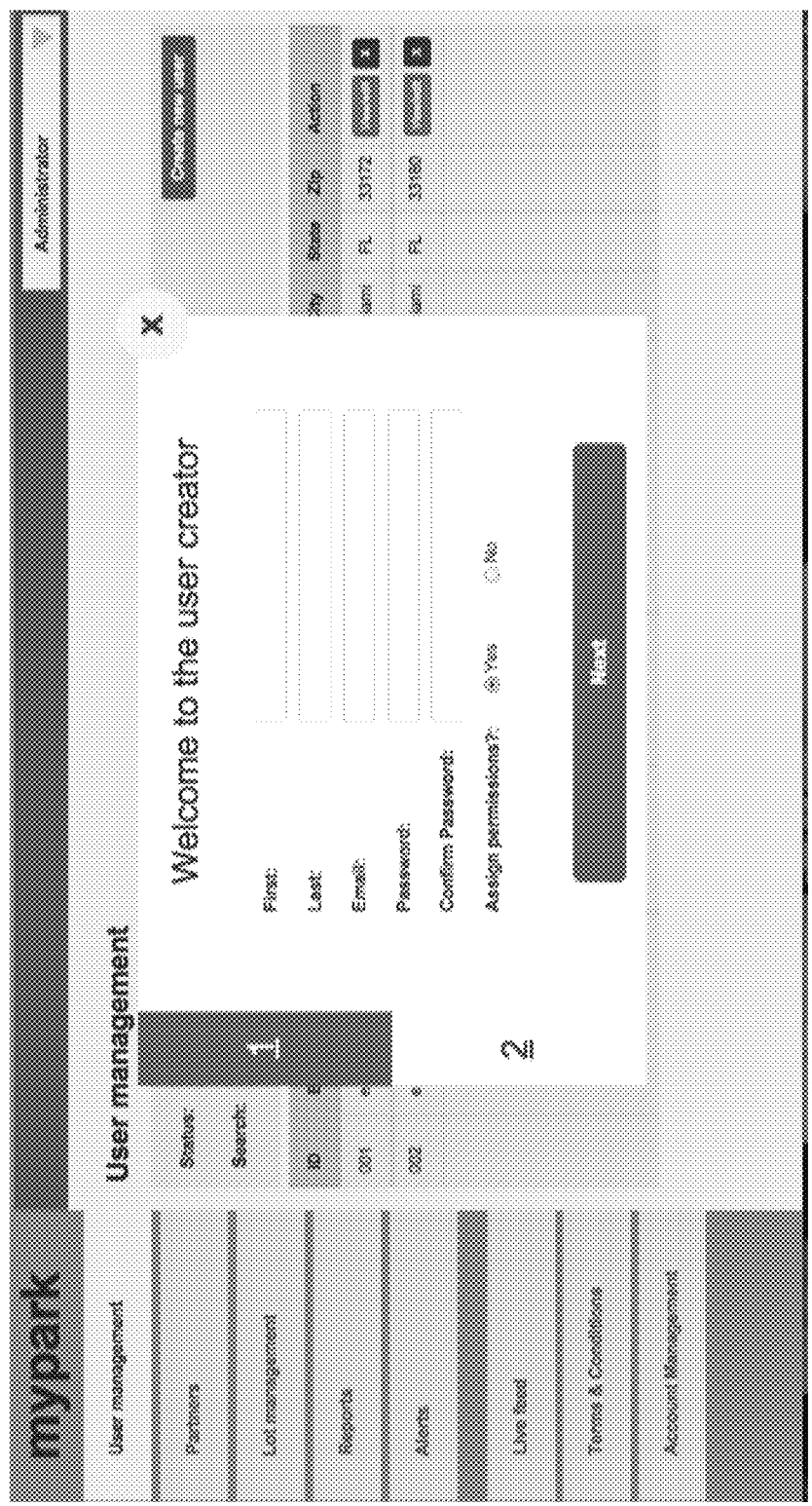
Figure 40:
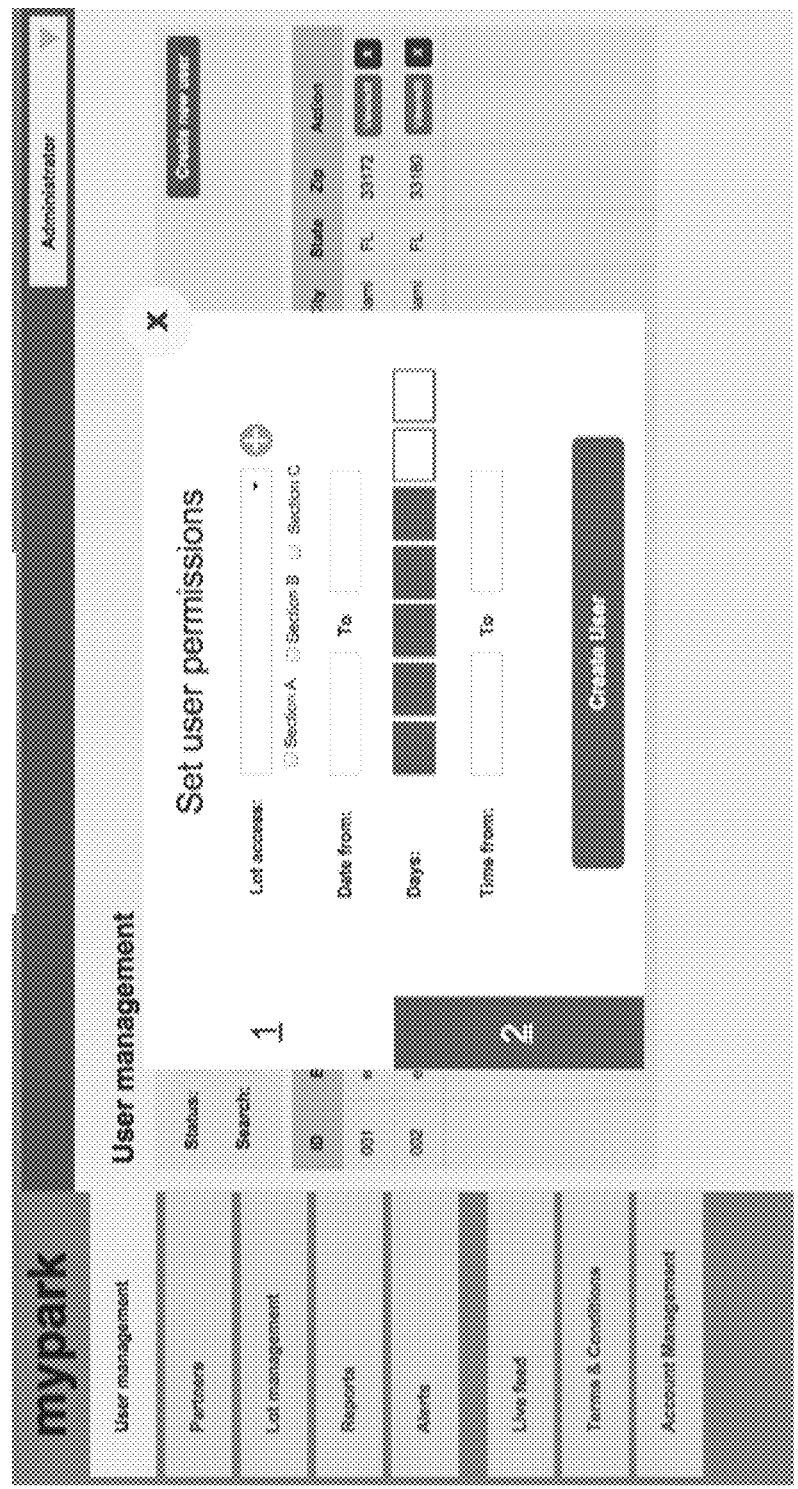
Figure 42:
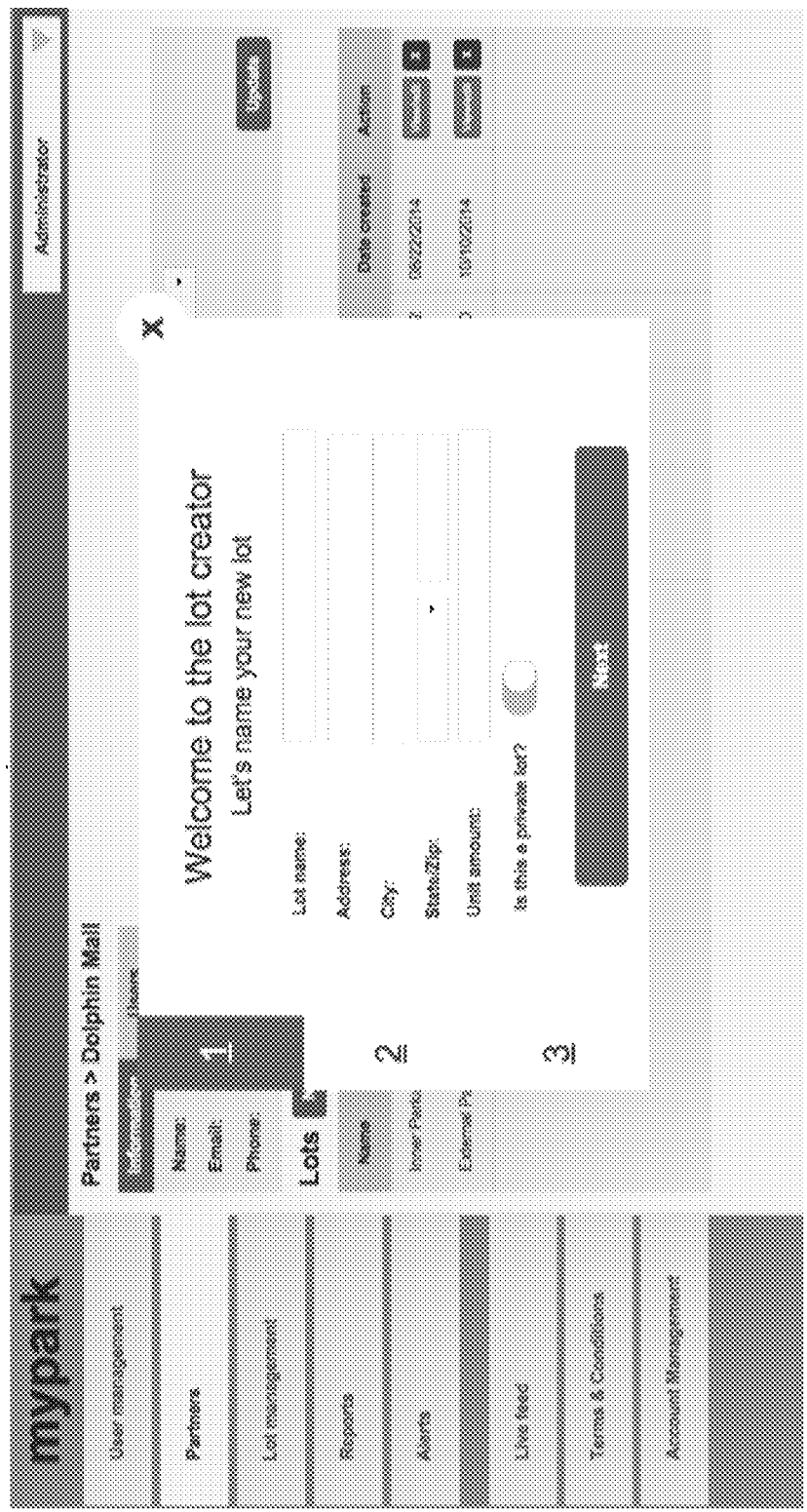
Figure 43:
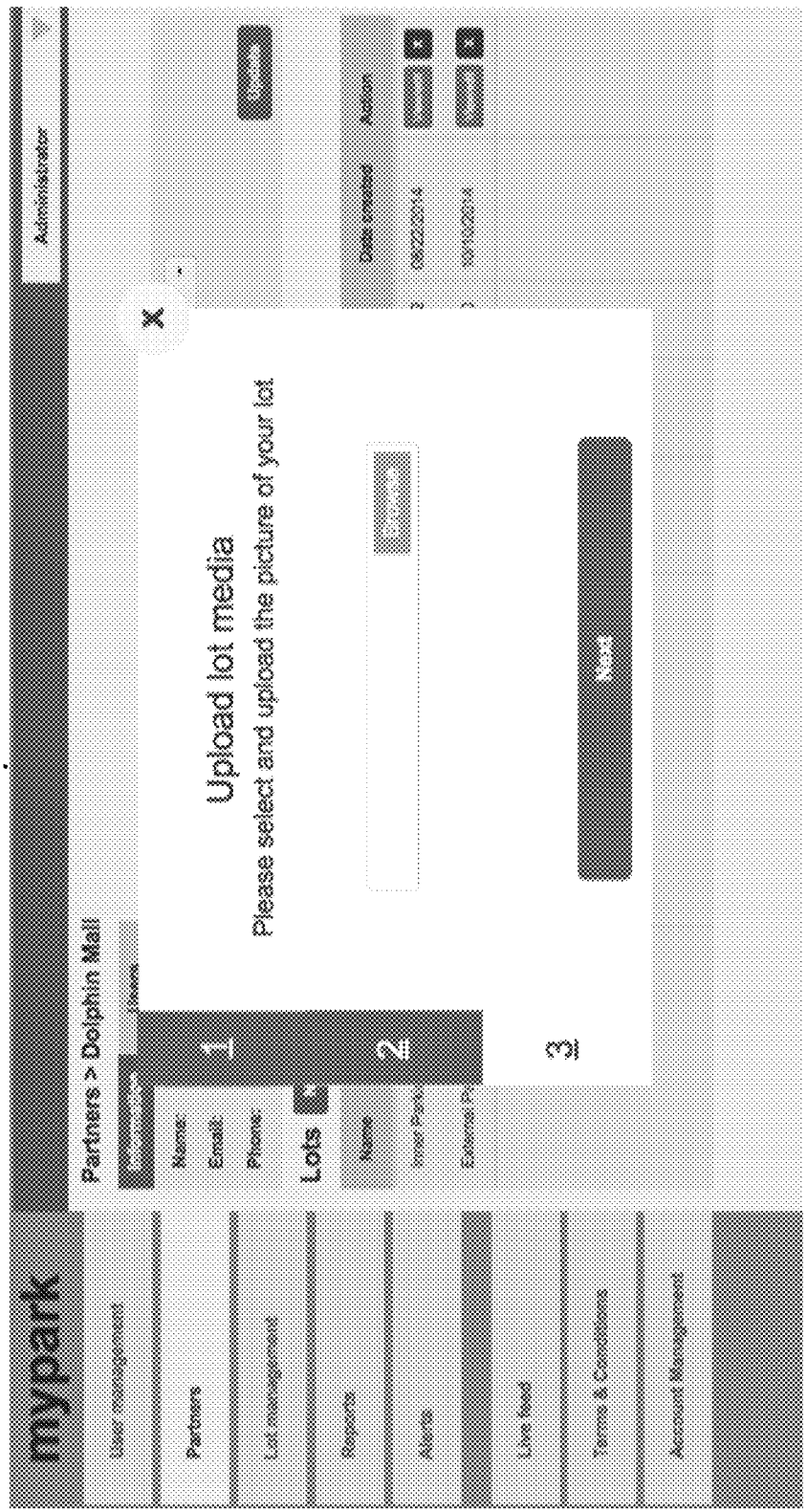
Figure 44:
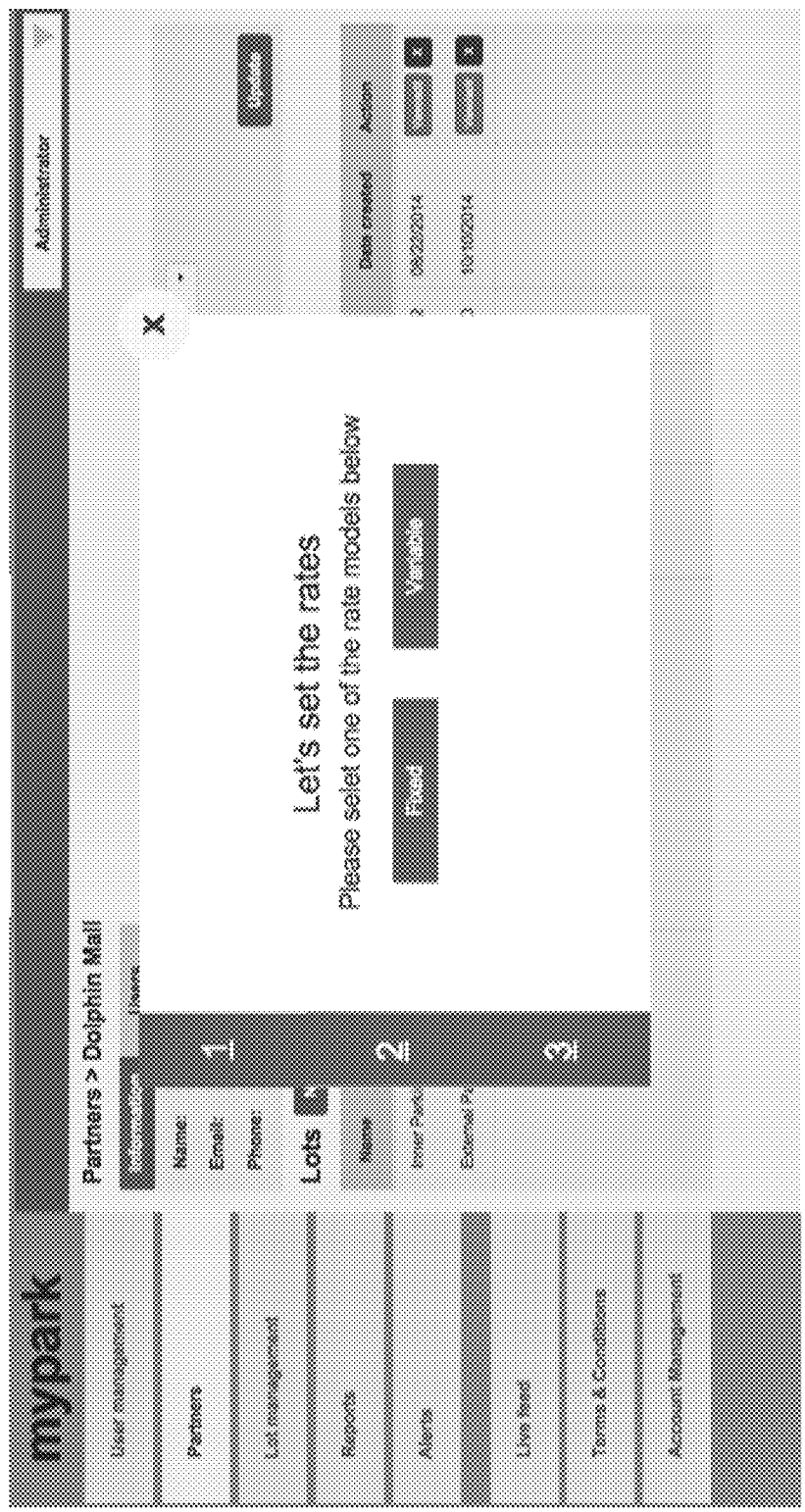
Figure 45:
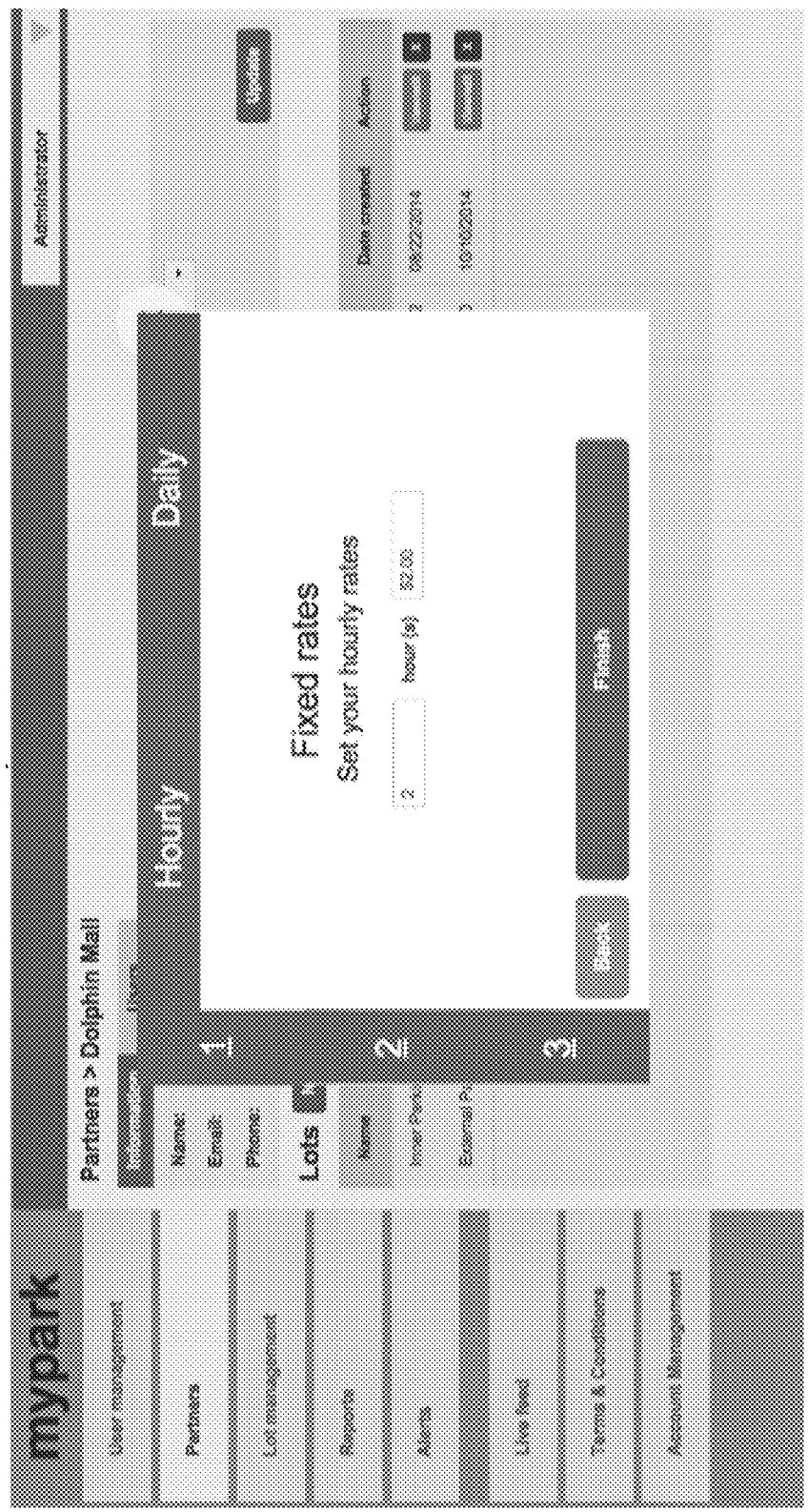
Figure 46:
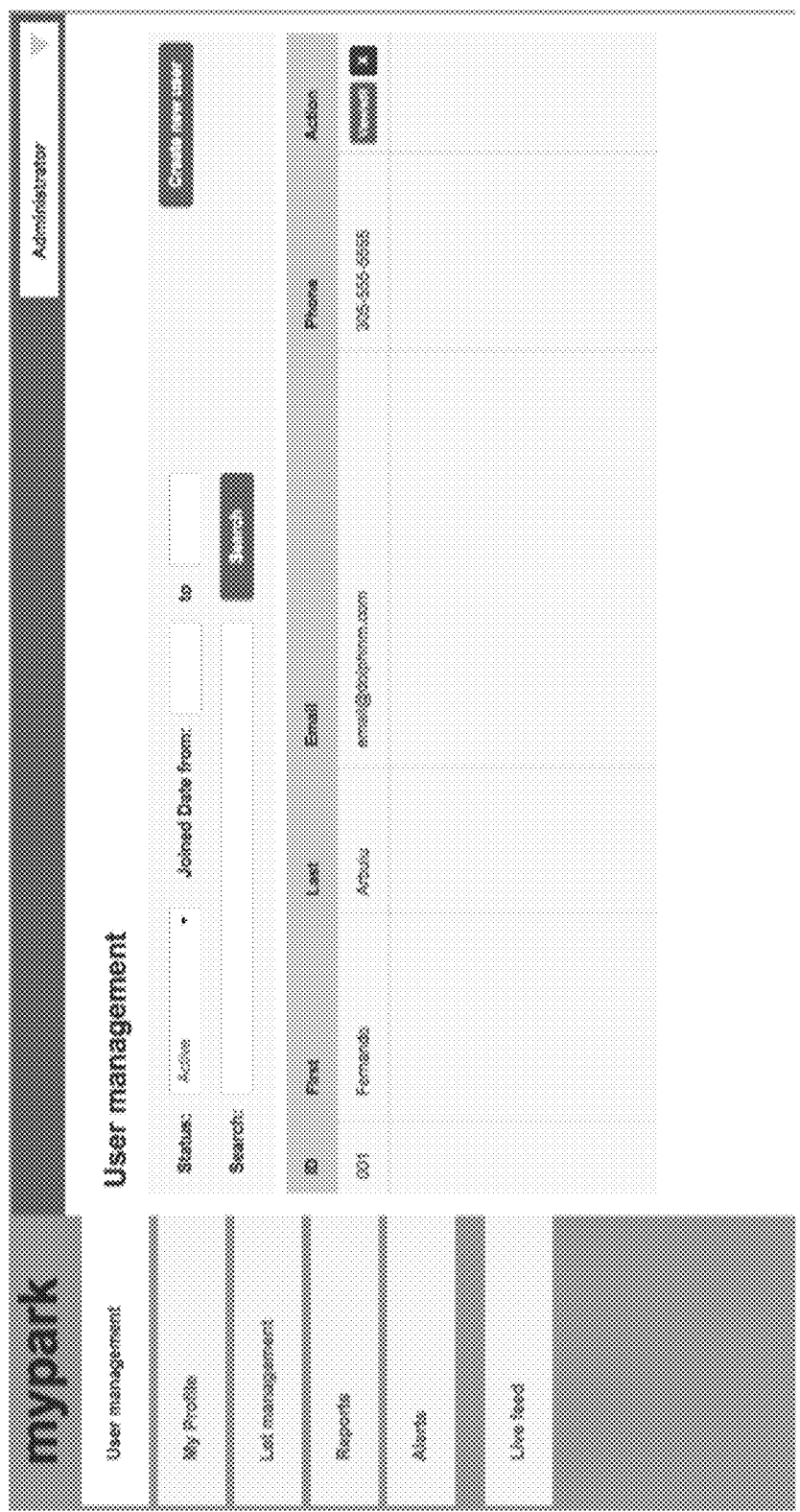
Figure 47:
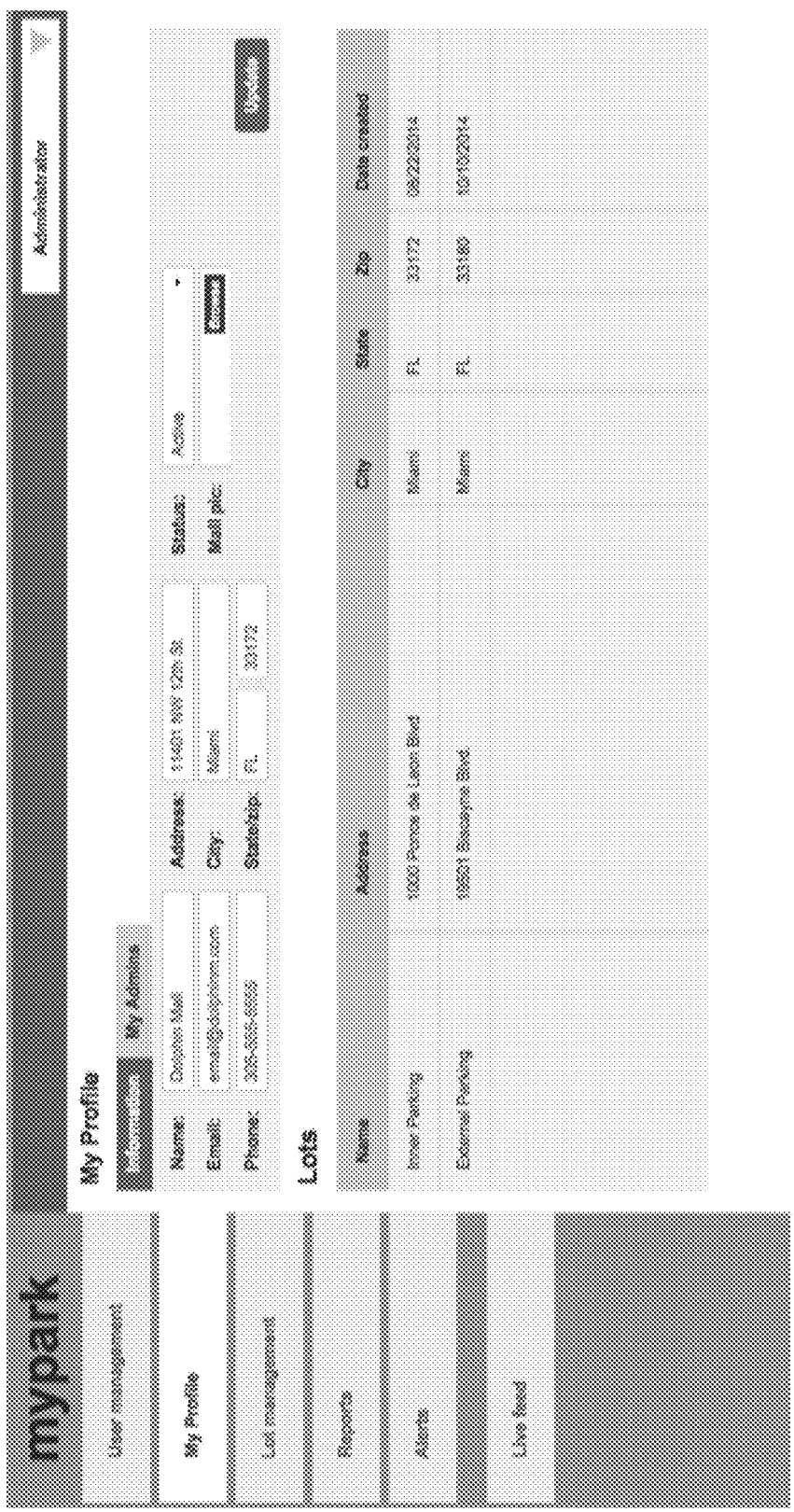
Figure 48:
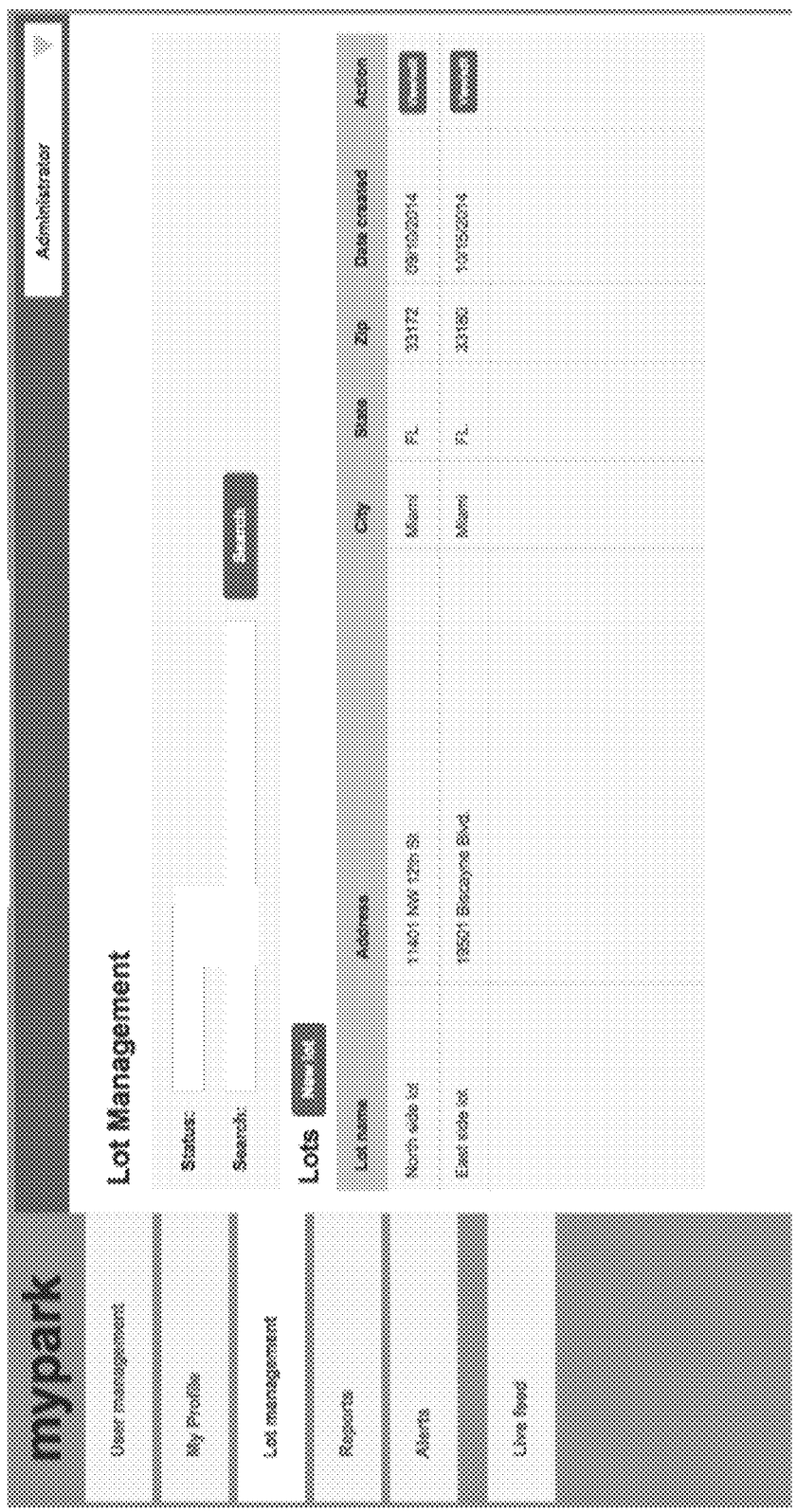
Figure 49:
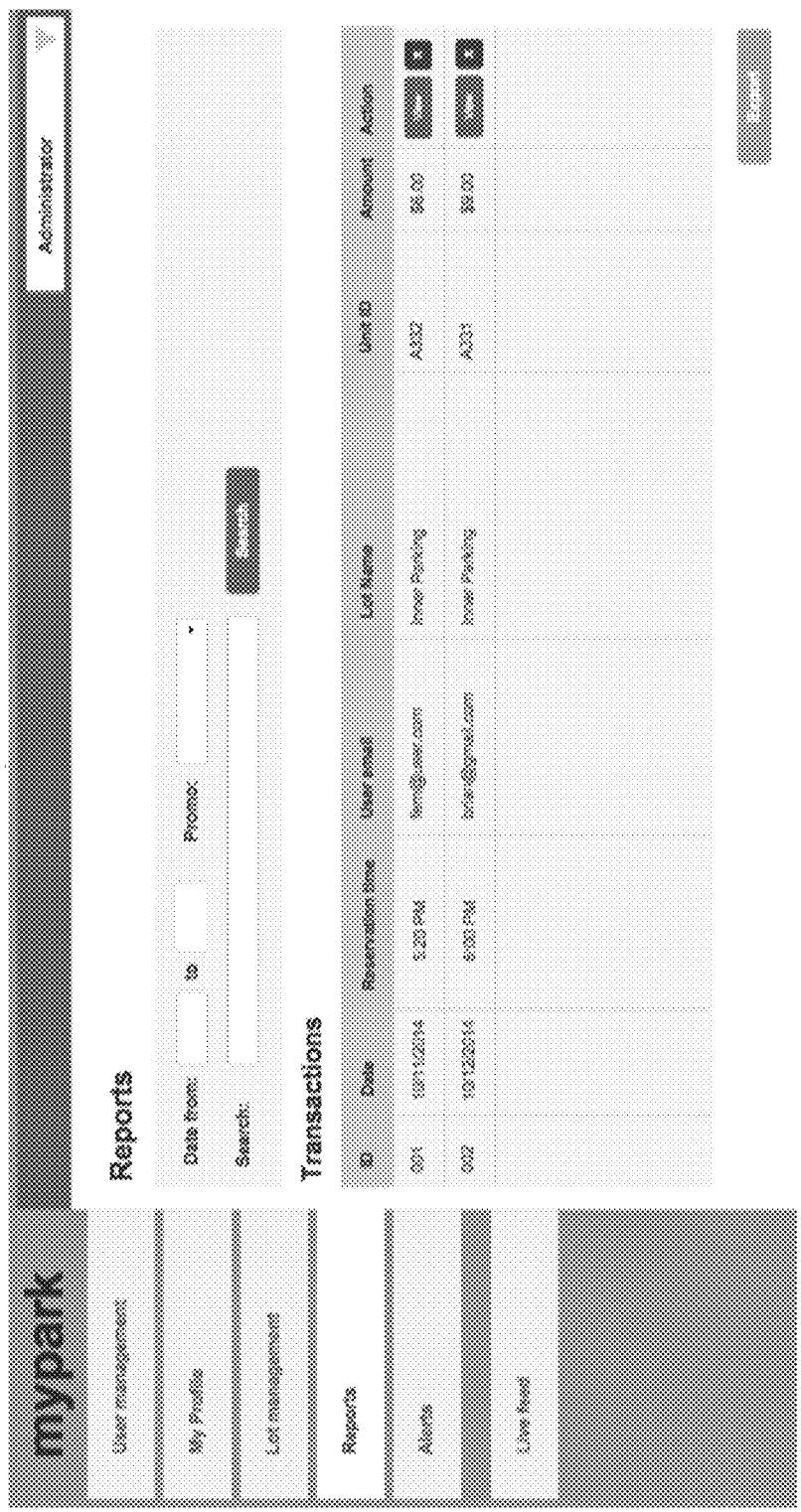
Figure 50:
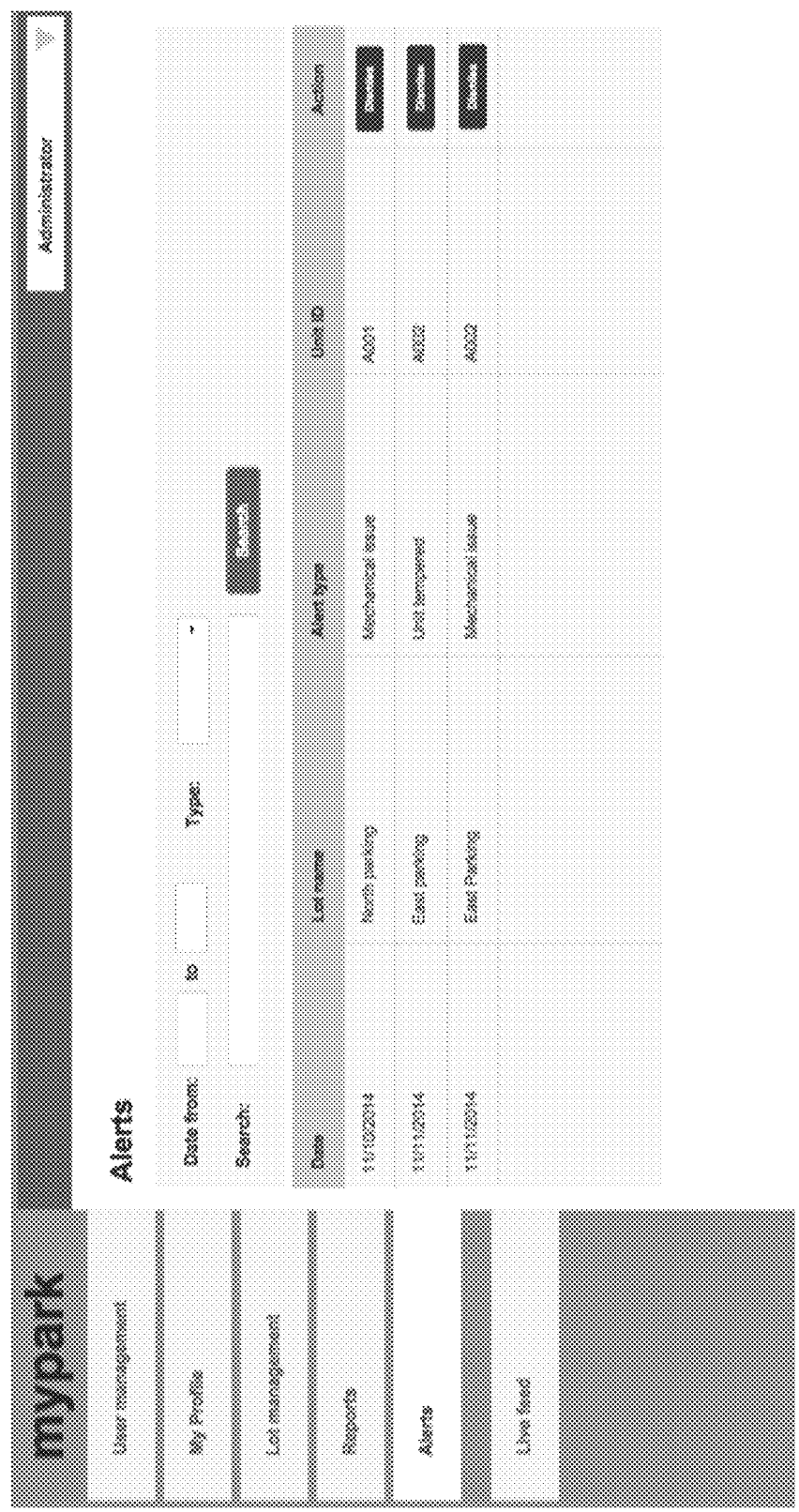
Figure 51:
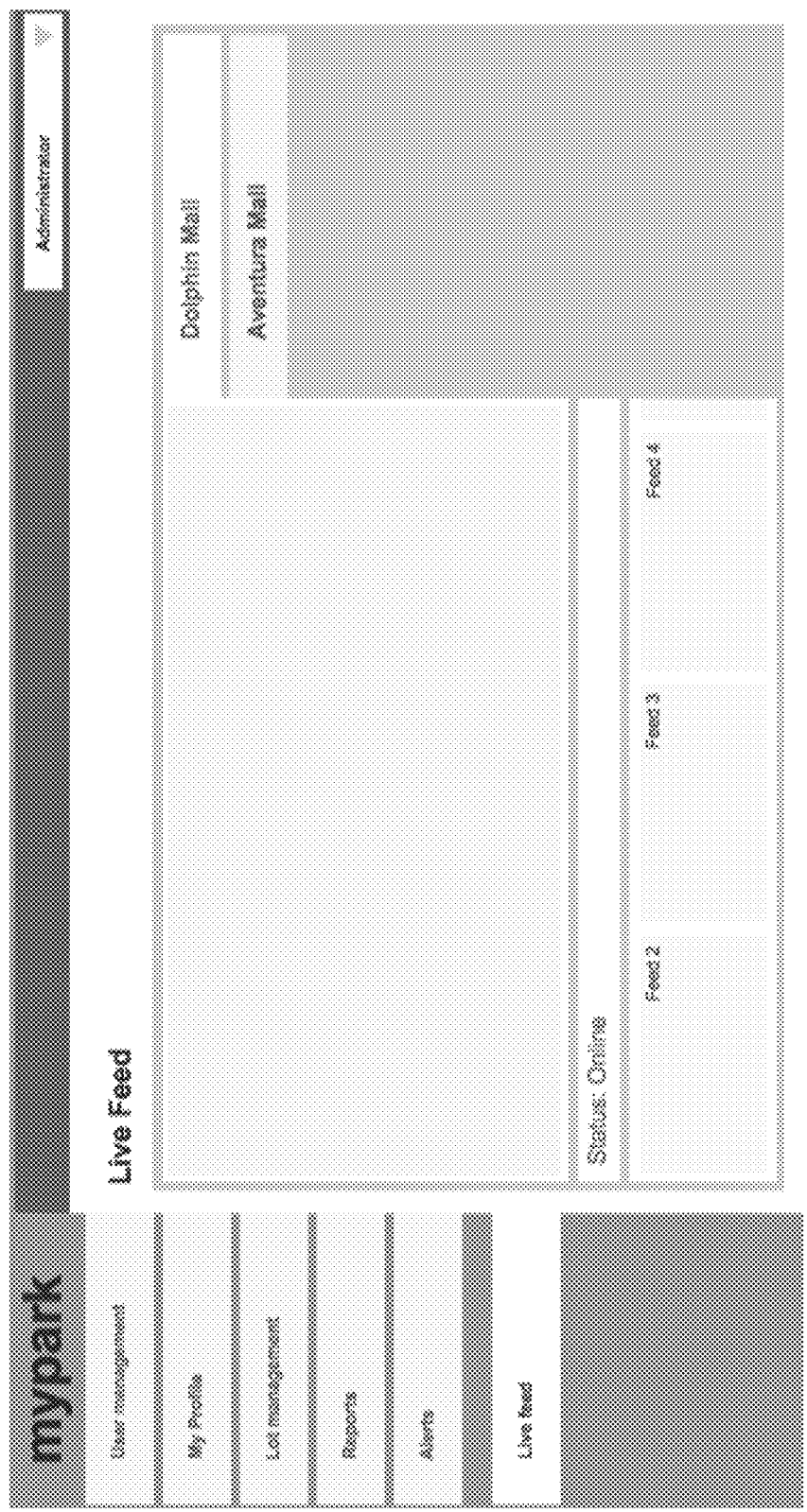
Figure 52:
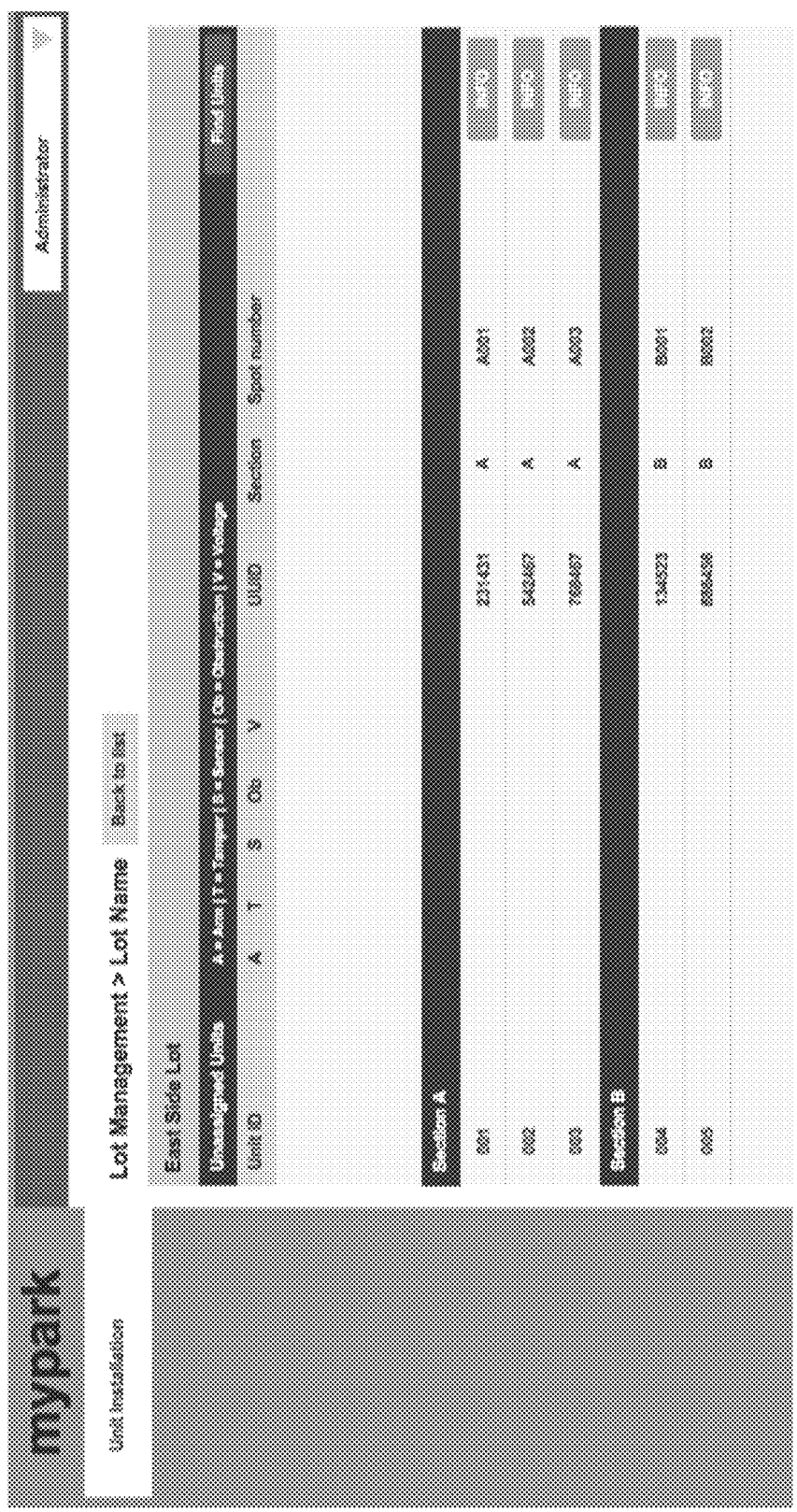
Figure 53:
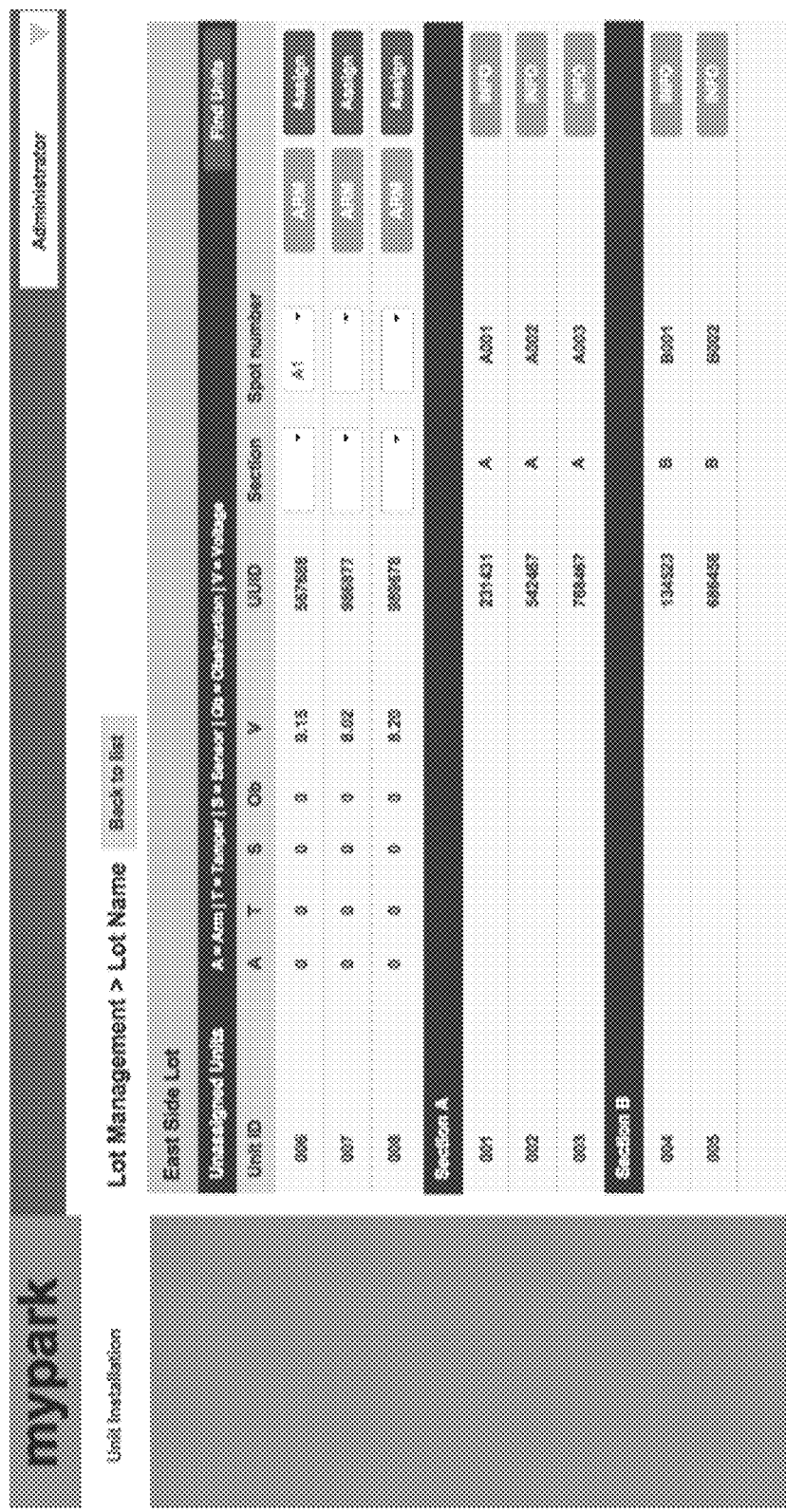
Figure 54:
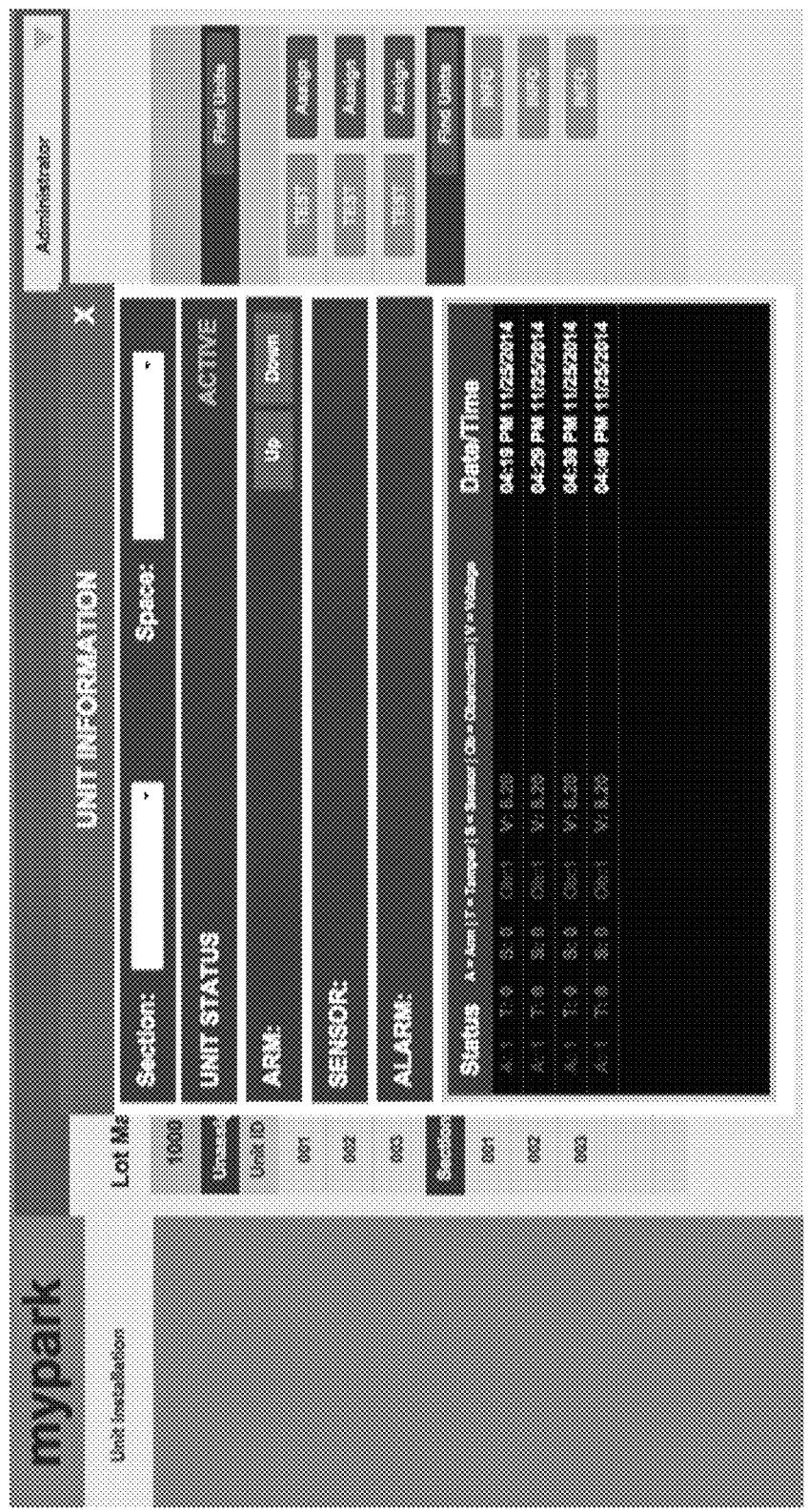

Referring now to FIG. 27, there is provided a simplified pictorial illustration of a physical barrier device 170, according to an embodiment of the present invention. This device comprises a parking administration device, which physically controls access to individual spaces and monitors activity by using a series of sensors embedded in the apparatus. The device is automatic, seamlessly integrated, solar powered 173, directly or wirelessly charged, impact resistant and waterproof.

An exemplary embodiment of the physical barrier device, as shown, comprises a base housing 171 and a barrier arm 172, which is pivotably attached to the base housing. This base housing is low-height so as to allow vehicles to park over it. The housing is constructed of durable materials that resist crushing in the event that a vehicle drives over it. The materials are also chosen to provide weather resistance, as they will be installed in locations prone to water, snow, ice, mud, and sun exposure. The base housing is further comprised of an electronics and control module (not shown). This module accepts electrical power to power motors (not shown) which raise and lower the barrier arm 172. The electronics and control module also provides a one or more microprocessor (not shown), or computing device, with communications capability in order to communicate with a Node Device, which issues commands to the apparatus, such as "Arm Up" or "Arm Down." The electronics and control module also communicates back to the Node Device with such information as arm position, space/location, tamper detection, obstruction detection, or voltage notices. The base housing further comprises a battery or power supply, as well as motors for raising and lowering the barrier.

The barrier arm 172 is operably attached to the base unit and, in an exemplary embodiment, rotates about one end of the base in order to lay flat or stand up, perpendicular to the floor, in order to provide a barrier to the parking space. This barrier arm is made of a durable material. In the event that the barrier is forced down, an audible alarm will trigger and the electronics and control module will send a command to the Node Device.

Embodiments of the apparatus may further comprise embedded circuitry configured to allow the apparatus to be controlled via a wired or wireless communications protocol by a control device. Embodiments of the apparatus may comprise a base portion which is fixedly attached to the ground and a barrier portion which is pivotably attached to the base portion such that it can be rotated up and away from the base to block access to a parking space and rotated down towards the base to allow for a vehicle to pass over the apparatus and park in the space. In another embodiment of the apparatus, a telescopically deployed arm (not shown) may also achieve this objective. Embodiments of the apparatus may include sensing means 174 to determine if a vehicle is parked in the space. These sensing means also allow the apparatus to know the precise location of a user within the area of the system as well as the user's behavior within the area in order to maximize the efficiency of the system and enhance the user experience. This sensing means 174 may be accomplished by many methods known to one of ordinary skill in the art including, but not limited to, proximity sensors, infrared sensors, pressure switches, mechanical relays, and the like.

Further embodiments of the present invention may include a parking barrier device with an integrated siren, or alarm. This siren would activate and alert a driver, or anyone in the vicinity, if the device is being tampered with, or if the device arm is being forced down.

Another embodiment of the present invention includes a barrier arm that includes a means for attaching a flag or other visual indicator. This attachment means may be any as is commonly known in the art including, but not limited to, clips, clamps, straps, magnets, or other mechanical fastening means.

Another embodiment of the present invention includes a barrier arm with integrated features that allow for the placement of signage, advertisements, or other visual media on the forward facing surface of the barrier arm 175. These features may be mechanical fastening features as would be known to one with ordinary skill in the art. In this way, for example, a parking facility may provide "billboard" space for advertisements on each parking barrier that is visible to anyone driving through the parking lot.

By way of example, and not limitation, it is contemplated to be within the scope of the invention that a parking barrier device utilizing a wireless communication protocol, such as Bluetooth, may recognize that a Bluetooth-enabled client device running the mobile application has come within networking range. The physical barrier device and mobile application could perform an automated handshake subroutine, authenticating the client device and connecting it to the physical barrier device. In this way, the client device, via the mobile application user interface, may receive specialized instructions, parking information, promotional offers, or location instructions. Additional features of this embodiment may include automated lowering of the barrier as the connected client device approaches the parking space with the physical barrier device, as well as automated raising of the barrier as the connected client device leaves the parking space.

In another embodiment of the present invention, it is contemplated that the physical barrier device may be operably configured to communicate directly, through wired or wireless communication means, to the server, thereby bypassing the need for a Node Device if that is desired in certain installations.

In a further embodiment of the present invention, it is contemplated that the physical barrier device may be operably configured to communicate directly, through a wireless communication protocol, to the client device. For example, the physical barrier device and the client device may establish a Bluetooth connection with each other, thereby enabling the mobile application running on the client device to directly send and receive commands from the physical barrier device.

Security Protocol.

An embodiment of the present invention includes the implementation of security protocols among and between the various components of the invention.

A method for the encryption of communications between the physical barrier device and the node device is presented here, in accordance with an embodiment of the present invention. Upon the initial establishment of a communicative connection between the physical barrier device and the node device, the node device sends a command requesting a key from the physical barrier device. A random 'one time' key is generated by the physical barrier device and is sent back to the node device. The node device stores this key for use with the next command. The previously generated 'one time' key must accompany each command to the physical barrier device. Upon receipt of a command, the physical barrier device verifies the onetime key. Upon verification of the onetime key, the physical barrier device processes the command, generates a new random 'one time' key and sends it back to the node device along with the command's response. In this way a unique encryption key is being generated every time a command is processed and this key is never used again.

A further method for the implementation of a security protocol to be used in an intelligent parking management system, according to an embodiment of the present invention, includes the use of a custom-programmed command language.

Mesh Networking and Location Awareness.

Embodiments of the present invention contemplate the use of mesh networking, as is known in the art, and location awareness through the utilization of network-connected node devices and physical barrier devices. Software running on the node devices and the physical barrier devices run automated subroutines to automatically connect physical barrier devices and node devices that are within communications range of each other. For example, in embodiments running Bluetooth communications protocols, physical barrier devices connect to node devices that provide the strongest communications signal. In the event that a Node Device goes offline, the parking barrier devices that were connected to it will automatically search for and associate themselves with the next closest Node Device (the next Node device with the strongest signal).

Additionally, physical barrier devices may recognize each other through their communications signals and Node Devices may recognize each other, according to an embodiment of the present invention. Through the use of this unit-to-unit awareness via mesh network communications, the system presents a location awareness. When a client device is also part of the system, the mesh network, through this location awareness is capable of providing, for example, direct-to-space driving directions to the parking client.

A preferred embodiment of the present invention would comprise a system, the system comprising one or more parking barrier devices, connected over a network to system back-end that manages parking space utilization, barrier operation and status, and inputs from one or multiple user applications.

Figure 26:
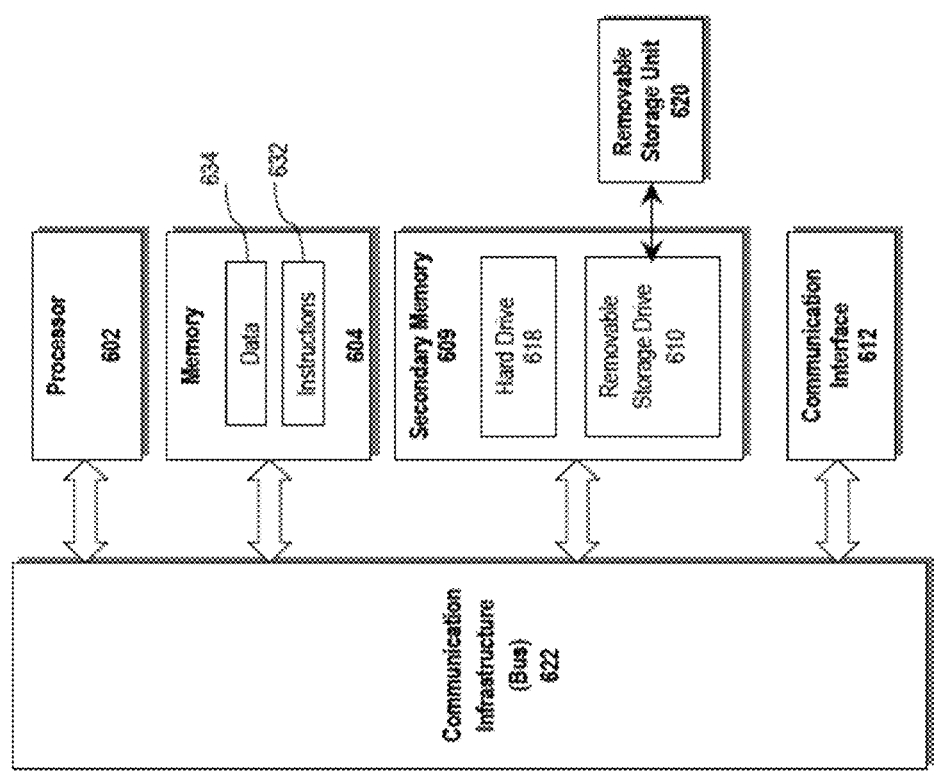
FIG. 26 shows a simplified block diagram of the computing system hardware components for the intelligent parking system, according to an embodiment of the present invention.

Throughout the description herein, various embodiments of the invention are disclosed as having processors, processing means, or other forms of computational means that, for the purposes of this invention, shall be interchangeably considered a "computer system." For purposes of this invention, computer system 600, as shown in FIG. 26, may represent any type of computer, information processing system or other programmable electronic device, including a client computer, a server computer, a portable computer, an embedded controller, a smartphone, a tablet computer, a personal digital assistant, a Cloud computing device, and so on. The computer system 600 may be a stand-alone device or networked into a larger system. Computer system 600, illustrated for exemplary purposes as a mobile computing device, is in communication with other networked computing devices (not shown). As will be appreciated by those of ordinary skill in the art, a network may be embodied using conventional networking technologies and may include one or more of the following: local area networks, wide area networks, intranets, public Internet and the like.

Throughout the description herein, an embodiment of the invention is illustrated with aspects of the invention embodied solely on computer system 600. As will be appreciated by those of ordinary skill in the art, aspects of the invention may be distributed amongst one or more computing devices which interact with computer system 600 via one or more data networks such as, for example, the Internet. However, for ease of understanding, aspects of the invention have been embodied in a single computing device—computer system 600.

Computer system 600 includes inter alia processing device 602, which communicates with an input/output subsystem 606, memory 604, and storage 610. The processor device 602 is operably coupled with a communication infrastructure 622 (e.g., a communications bus, cross-over bar, or network). The processor device 602 may be a general or special purpose microprocessor operating under control of computer program instructions 632 executed from memory 604 on program data 634. The processor 602 may include a number of special purpose sub-processors such as a comparator engine, each sub-processor for executing particular portions of the computer program instructions. Each sub-processor may be a separate circuit able to operate substantially in parallel with the other sub-processors.

Some or all of the sub-processors may be implemented as computer program processes (software) tangibly stored in a memory that perform their respective functions when executed. These may share an instruction processor, such as a general purpose integrated circuit microprocessor, or each sub-processor may have its own special purpose processor for executing instructions. Alternatively, some or all of the sub-processors may be implemented in an ASIC. RAM may be embodied in one or more memory chips.

The memory 604 may be partitioned or otherwise mapped to reflect the boundaries of the various memory subcomponents. Memory 604 may include both volatile and persistent memory for the storage of: operational instructions 632 for execution by CPU 602, data registers, application storage and the like. Memory 604 can include a combination of random access memory (RAM), read only memory (ROM) and persistent memory such as that provided by a hard disk drive 618 in secondary memory 609. The computer instructions/applications that are stored in memory 604 are executed by processor 602. The computer instructions/applications 632 and program data 634 can also be stored in hard disk drive 618 for execution by processor device 602.

The computer system 600 may also include a removable storage drive 610, representing a floppy disk drive, a magnetic tape drive, an optical disk drive, and the like. The removable storage drive 610 reads from and/or writes to a removable storage unit 620 in a manner well known to those having ordinary skill in the art. Removable storage unit 620, represents a floppy disk, a compact disc, magnetic tape, optical disk, CD-ROM, DVD-ROM, etc. which is read by and written to by removable storage drive 610. As will be appreciated, the removable storage unit 620 includes a non-transitory computer readable medium having stored therein computer software and/or data.

The computer system 600 may also include a communications interface 612. Communications interface 612 allows software and data to be transferred between the computer system and external devices. Examples of communications interface 612 may include a modem, a network interface (such as an Ethernet card), a communications port, a PCMCIA slot and card, etc. Software and data transferred via communications interface 612 are in the form of signals which may be, for example, electronic, electromagnetic, optical, or other signals capable of being received by communications interface 612.

In this document, the terms "computer program medium," "computer usable medium," and "computer readable medium" are used to generally refer to both transitory and non-transitory media such as main memory 604, removable storage drive 620, a hard disk installed in hard disk drive 618. These computer program products are means for providing software to the computer system 610. The computer readable medium 620 allows the computer system 600 to read data, instructions, messages or message packets, and other computer readable information from the computer readable medium 620.

Certain features described herein may be implemented in many ways known by one skilled in the art. For example, certain features may be implemented as "logic" or a "unit" that performs one or more functions. This logic or unit may include hardware, such as one or more microprocessors, application specific integrated circuits, or field programmable gate arrays, software, or a combination of hardware and software.

The present invention may address one or more of the problems and deficiencies of the prior art discussed above. However, it is contemplated that the invention may prove useful in addressing other problems and deficiencies in a number of technical areas. Therefore the claimed invention should not necessarily be construed as limited to addressing any of the particular problems or deficiencies discussed herein.

In light of the foregoing description, it should be recognized that embodiments in accordance with the present invention can be realized in numerous configurations contemplated to be within the scope and spirit of the claims. Additionally, the description above is intended by way of example only and is not intended to limit the present invention in any way, except as set forth in the claims presented.

The appended drawings and figures illustrate various embodiments of the present invention. It is contemplated that various other embodiments of the present invention may be within the scope of what has been disclosed herein even though it may not be shown in the embodiments depicted in the appended drawings and figures.

Therefore, while there has been described what is presently considered to be the preferred embodiment, it will understood by those skilled in the art that other modifications can be made within the spirit of the invention. The above descriptions of embodiments are not intended to be exhaustive or limiting in scope. The embodiments, as described, were chosen in order to explain the principles of the invention, show its practical application, and enable those with ordinary skill in the art to understand how to make and use the invention. It should be understood that the invention is not limited to the embodiments described herein.

The invention claimed is:

1. A computer-implemented method for providing a parking management service, the method comprising the steps of:
   providing a server, operatively configured to send and receive commands and instructions to and from a database;
   providing an application to a parking client, where said application is operatively configured to provide an instruction set to a client device thereby rendering the client device to be communicatively operative with said server;
   providing an Internet accessible user interface that is in communication with said server and is operatively configured to send and receive operations to and from said database;
   providing a one or more node device that is in communication with said server;
   providing a one or more parking barrier device that is in communication with said node device, wherein each said parking barrier device is fixedly attached and controls access to a single parking space;
   configuring of a parking lot via operations executed on the Internet accessible user interface;
   storing to the database a set of configuration parameters for said parking lot;
   displaying on said application availability of said parking lot;
   receiving by the server a request from the application to reserve a parking space at said parking lot;
   querying of the database by the server as to the availability of parking spaces at said parking lot;

returning by the database to the server information about available parking spaces; communicating said available parking spaces by the server to the application; receiving from the application a command to reserve the parking space by the server;

transmitting of a parking reservation command to the node device associated with the reserved parking space;

receiving by the server from the application a command that indicates that the parking space is ready to be occupied;

sending a command by the server to the node device that the parking space is ready to be occupied;

sending a command from the node device to the parking barrier device to withdraw the parking barrier, thereby allowing the parking space to be occupied;

receiving a command from the parking barrier device by the node device that the parking space is now occupied;

sending a command from the node device to the server that the parking space is now occupied;

sending a command from the server to the database to indicate that the parking space is now unavailable;

sending, upon egress from the parking space, a command from the parking barrier device to the node device that the parking space is now available;

sending a command from the node device to the parking barrier device to reposition the parking barrier, thereby blocking the parking space from being occupied;

sending a command from the node device to the server that the parking space is now unoccupied;

sending a command from the server to the database to indicate that the parking space is now available;

calculating by the server a charge amount based upon the parking lot configuration; and charging by the server said charge amount to the parking client, whereby a parking management service is provided.

* * * * *